(12) United States Patent
Uno

(10) Patent No.: US 6,301,066 B1
(45) Date of Patent: Oct. 9, 2001

(54) STORAGE DEVICE HAVING INTERNAL AND EXTERNAL RECORDING CIRCUITS

(75) Inventor: Hiroshi Uno, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/162,225

(22) Filed: Sep. 28, 1998

(30) Foreign Application Priority Data

Nov. 17, 1997 (JP) .................................................... 9-315606
Jun. 30, 1998 (JP) ................................................. 10-185221

(51) Int. Cl.⁷ ................................................... G11B 5/09
(52) U.S. Cl. .................. 360/45; 360/46; 360/51
(58) Field of Search .................. 360/45, 46, 51

(56) References Cited

U.S. PATENT DOCUMENTS

| 5,184,256 | * | 2/1993 | Chikusa ................................. | 360/45 |
| 5,341,249 | * | 8/1994 | Abbott et al. ........................... | 360/51 |
| 5,594,600 |   | 1/1997 | Bruner et al. .......................... | 360/69 |

FOREIGN PATENT DOCUMENTS

| 583112   | 1/1983 | (JP) . |
| 5979417  | 5/1984 | (JP) . |
| 6168778  | 4/1986 | (JP) . |
| 1227268  | 9/1989 | (JP) . |
| 344866   | 2/1991 | (JP) . |
| 5159477  | 6/1993 | (JP) . |
| 765535   | 3/1995 | (JP) . |
| 7161161  | 6/1995 | (JP) . |
| 7334945  | 12/1995 | (JP) . |
| 845240   | 2/1996 | (JP) . |
| 8293164  | 11/1996 | (JP) . |
| 955023   | 2/1997 | (JP) . |

OTHER PUBLICATIONS

"Chips for hard disk drives help slash storage costs"; *Computer Design*; Apr. 1997; pp. 39, 42, 44.

Richard Nass; "Disk–Drive Makers: 'Out With The Old; In With The New'"; *Electronic Design*; Aug. 5, 1996, pp. 69, 70, 72 and 76.

\* cited by examiner

*Primary Examiner*—Alan T. Faber
(74) *Attorney, Agent, or Firm*—Greer, Burns & Crain, Ltd.

(57) ABSTRACT

An extra-HDA record reproducing circuit for outputting write data comprising parallel data is provided outside a disk assembly, and a intra-HDA record reproducing circuit comprising a parallel-to-serial conversion circuit for receiving write data comprising parallel data and converting the write data to serial data, a write amplifier for switching a polarity of a recording current to be supplied to a head according to the write data converted to serial data, and a preamplifier for amplifying a read signal detected by the head is provided within the disk assembly, and the write data is transferred at a high speed at least from the extra-HDA record reproducing circuit to the intra-HDA record reproducing circuit.

15 Claims, 10 Drawing Sheets

STORAGE DEVICE HAVING INTERNAL AND EXTERNAL RECORDING CIRCUITS

FIELD OF THE INVENTION

The present invention relates to a disk device, and further to a hard disk device as an external storage device for a computer or the like.

BACKGROUND OF THE INVENTION

Conventionally a hard disk device has been used as an external storage device for a computer or the like. Capacity of a hard disk device has been becoming increasingly larger in association with improvement in performance of a computer and increase in a program size of software used therein. For this reason, also a recording density in a disk device has substantially increased, and also it is now strongly required to make higher a data transfer rate in data communications.

FIG. 10 is a block diagram showing configuration of a general magnetic disk device based on the conventional technology. In this magnetic disk device, there are provided such devices as a plurality sheets of disk 81, a spindle motor (SPM) 82 for rotating the disk devices, a carriage 84 having a magnetic head 83 at its head, and a voice coil motor (VCM) 85 for rotating the carriage 84. The disk 81, spindle motor 82, magnetic head 83, carriage 84, and voice coil motor 855 are accommodated in an enclosure comprising a base and a cover, and constitute a shielded head disk assembly (HDA) 80 (also called disk enclosure (DE).

Provided on a flexible printed circuit sheet connected to the carriage 84 or between the carriage 84 and a printed circuit board outside the disk assembly (HDA) 80 is a head IC 86 comprising a write amplifier and a preamplifier. The write amplifier switches a polarity of a recording current to be supplied to the magnetic head 83 according to write data. The preamplifier amplifiers a reproducing voltage (a read signal) detected by the magnetic head 83. This head IC 86 is provided in the disk assembly (HDA) 80.

In the magnetic disk device, a printed circuit board is attached to a bottom plate of an enclosure for the disk assembly (HDA) 80 from the outside. This printed circuit board is connected to the flexible printed circuit sheet inside the enclosure for the disk assembly (HDA) 80 via a connector. Provided on this external attached printed circuit board are a hard disk controller (HDC) circuit 70, a buffer circuit 71, a read channel circuit 72, a servo demodulating circuit 73, a VCM driving circuit 74, an SPM driving circuit 75, a digital signal processor (DSP) circuit 76, and a microcontrol unit (MCU) circuit 77.

The HDC circuit 70 controls an interface (not shown) for transaction of various commands or data with a CPU (central processing unit) in an upper apparatus such as a basic system of a computer. Also the HDC circuit 70 generates a control signal for controlling a format for regenerating record on a disk. The buffer circuit 71 temporally stores therein write data sent from the CPU 9 and read data read out from a disk.

The read channel circuit 72 comprises a modulating circuit for recording write data in a disk, a parallel-to-serial conversion circuit for converting parallel write data to serial data, a demodulating circuit for reproducing read data from the disk, a serial-to-parallel conversion circuit for converting serial read data to parallel data.

The servo demodulating circuit 73 demodulates a servo pattern for positioning recorded on a disk by means of peak holding or integration. The VCS driving circuit 74 has a power amplifier for allowing to flow a driving current to the voice coilmotor 85. The SPM driving circuit 75 has a power amplifier for allowing a driving current to flow to the spindle motor 82.

The DSP circuit 76 has a microprocessor for controlling a servo circuit for positioning the magnetic head 83. And, the DSP circuit 76 recognizes a position signal outputted from the servo demodulating circuit according to a program stored in a memory, controls a driving circuit in the VCM driving circuit, and also controls rpm of a magnetic disk device under control by a driving current from the SPM driving circuit or the like.

The MCU circuit 77 provides controls over the HDC circuit 70, DSP circuit 76, and buffer circuit 71 according to a program stored in a memory.

In the disk device having the configuration as described above, write data is transferred from the read data channel 72 provided on a printed circuit board outside the enclosure via a flexible printed circuit sheet to a write amplifier in the head IC 86. Rise and fall of the write data are recorded as they are in the disk.

For this reason, rise and fall of a write data pulse must be transferred from the read channel data 72 to the write amplifier rapidly and also accurately. For that purpose, write data is transferred as a differential and balanced type of serial data to a write amplifier.

There has been proposed an idea (Japanese Patent Laid-Open Publication No. HEI 9-55023) that a parallel-to-serial converter is provided just before the write amplifier, and write data is transferred as parallel data in a transfer path until it reaches the parallel-to-serial converter, by which the write data is converted to serial data to be supplied to the write amplifier. In this invention disclosed in Japanese Patent Laid-Open Publication No. HEI 9-55023, a write compensation circuit as a record-timing correcting circuit for correcting a timing for recording write data is provided just before the parallel-to-serial converter, and for this reason, the write compensation circuit is structured as a circuit for handling parallel data.

In a device having the configuration as shown in FIG. 10, however, a flexible printed circuit sheet used to transfer write data is long for the purpose to insure movability of the carriage 84 and also to transfer data to the outside of the enclosure. So, with a high write data transfer rate and a small pulse width as realized in the advanced technology developed in recent years, a pulse amplitude of write data becomes lower after it is transmitted from the read channel circuit 72 until it reaches a write amplifier. Because of the feature as described above, a data recording position (rising and falling positions of a write data pulse) in a disk may become inaccurate, which may in turn degrade a reproducing margin and lower reliability of data.

Also, in the invention disclosed in Japanese Patent Laid-Open Publication No. HEI 9-55023, the write compensation circuit is a circuit for parallel data, so that configuration of the circuit is complicated, which may cause the circuit to be larger in its scale as well as a heating value during the operation to extremely increase.

SUMMARY OF THE INVENTION

It is an object of the invention to provide a storage device which can transfer data at a higher rate as compared to that in the conventional technology and especially which can transfer write data at a high speed without causing lowering of amplitude of a write data pulse.

With the present invention, as an internal recording circuit capable of receiving parallel data is provided inside an enclosure thereof, a serial transfer path between a write amplifier and a circuit just before becomes remarkably shorter as compared to that in a magnetic disk device based on the conventional technology, so that write data can be transferred at a high speed without compensating a pulse amplitude by widening a pulse width.

Further parallel data transfer is executed in a section where a long transfer path is required to be provided between an external recording circuit outside the enclosure and an internal recording circuit inside the enclosure, so that write data can be transferred at a high speed without compensating a pulse amplitude by widening a pulse width.

Further, with the invention described above, as a write compensation circuit is provided between the parallel-to-serial conversion circuit and the write amplifier, data inputted to the write compensation circuit and data outputted therefrom are serial data, so that the write compensation circuit may comprise a circuit for handling serial data. For this reason, the currently existing write compensation circuit for serial data can be used as a write compensation circuit.

With the present invention, a serial transfer path between a write amplifier and a circuit just before the write amplifier including an encoder circuit can be accommodated in an enclosure, so that the serial transfer path between a write amplifier and a circuit just before is remarkably shorted as compared to that in the conventional type of magnetic disk device. Also in a section where a long transfer path is provided between an external recording circuit outside the enclosure and an internal recording circuit inside the enclosure, data is transferred in the parallel mode, so that write data can be transferred at a high speed without causing the pulse amplitude to be lowered.

With the present invention, a serial transfer path between a write amplifier and a circuit just before the write amplifier including a write compensation circuit can be accommodated within an enclosure thereof, so that the serial transfer path between a write amplifier and a circuit just before is remarkably shorted as compared to that in the conventional type of magnetic disk device, and also data is transferred in the parallel mode in a section where a long transfer path is provided between an external recording circuit outside the enclosure and an internal recording circuit inside the enclosure, and for this reason write data can be transferred at a high speed without causing the pulse amplitude to be lowered.

With the present invention, data is transferred in the parallel mode in a transfer path between an external reproducing circuit and an internal reproducing circuit, so that not only write data, but also read data can be transferred at a high speed.

With the present invention, a serial transfer path between a write amplifier and a circuit just before the write amplifier including a precoder circuit can be accommodated within an enclosure, so that the serial transfer path between a write amplifier and a circuit just before is remarkably shorted as compared to that in the conventional type of magnetic disk device, and also in a section where a long transfer path is provided between an external recording circuit outside the enclosure and an internal recording circuit inside the enclosure, data is transferred in the parallel mode, so that write data can be transferred at a high speed without compensating a pulse amplitude by means of widening a pulse width.

With the present invention, a serial transfer path between a write amplifier and a circuit Just before the write amplifier including a write compensation circuit can be accommodated within an enclosure, so that the serial transfer path between a write amplifier and a circuit just before is remarkably shorted as compared to that in the conventional type of magnetic disk device, and also in a section where a long transfer path is provided between an external recording circuit outside the enclosure and an internal recording circuit inside the enclosure, data is transferred in the parallel mode, so that write data can be transferred at a high speed without compensating a pulse amplitude by means of widening a pulse width.

With the present invention, data is transferred in the parallel mode between an external reproducing circuit and an internal reproducing circuit, so that not only write data, but also read data can be transferred at a high speed.

With the present invention, also a transfer path for a clock signal for writing data can also be accommodated within an enclosure, so that the transfer path is remarkably shorted as compared to that in the conventional technology, and for this reason also a frequency of a clock signal can be made higher, and write data can be transferred at a further higher speed.

With the present invention, a serial transfer path between a write amplifier and a circuit just before is remarkably shorted as compared to that in the conventional technology, and also data is transferred in the parallel mode from an external record reproducing circuit to an internal recording circuit, so that write data can be transferred to a head at a high speed. Also a transfer path from some or all of circuits constituting the internal recording circuit to the head can be made shorter, so that reliability in write data transfer can be improved and also the write data can be transferred at a high speed.

With the present invention, a serial transfer path between a write amplifier and a circuit just before is remarkably shorter as compared to that in the conventional technology, and also data is transferred in the parallel mode from an external recording circuit to an internal recording circuit, so that write data can be transferred to a head at a high speed. Also a transfer path from some or all of the circuits constituting the internal recording circuit to the head can be made shorter, and for this reason reliability in write data transfer can be improved and also the write data can be transferred at a high speed.

With the present invention, configuration of an external recording and/or external reproducing circuit and an internal recording and/or internal reproducing circuit can be simplified to reduce a space in an enclosure for installation thereof, and also the circuit or circuits can be accommodated in a chip, so that protection against noise from the chip is insured, which makes it possible to provide a compact and high reliability storage device.

With the present invention, timing of rise and fall of a write data pulse degraded when transferred through a long serial transfer path between an external recording circuit outside an enclosure and an internal recording circuit inside the enclosure is reproduced and transmitted by an amplifier in the internal recording circuit, so that write data can be transferred at a high speed.

Other objects and features of this invention will become understood from the following description with reference to the accompanying drawings.

DETAILED DESCRIPTION OF THE EMBODIMENTS

Figure 1:
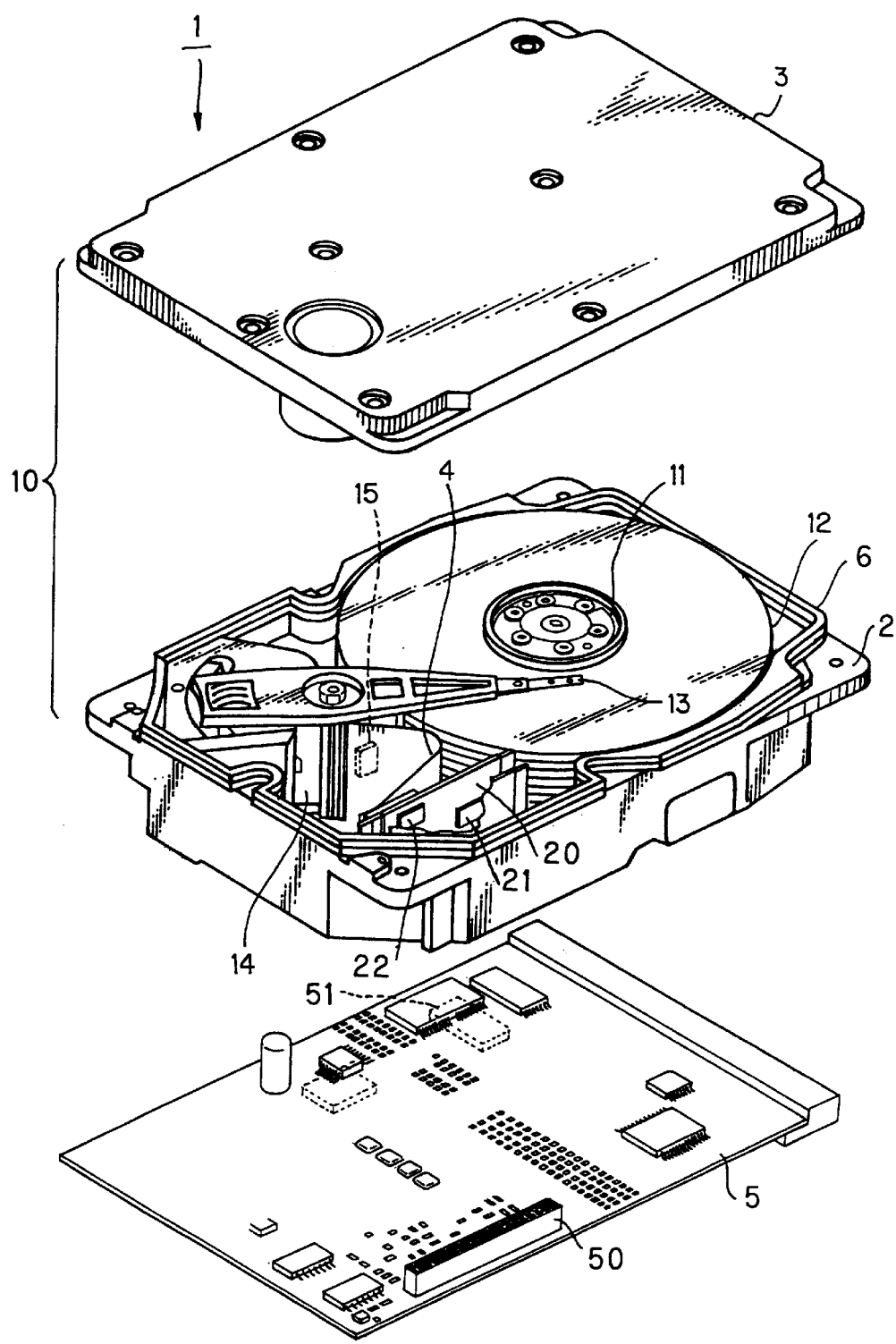
FIG. 1 is an external perspective view showing an example of mechanical configuration of a storage device according to the present invention with the cover removed and a portion thereof broken.

Next detailed description is made for embodiments of the storage device according to the present invention with reference to FIG. 1 to FIG. 9.

A disk device is a type of, for instance, magnetic disk device, and is a hard disk device which is an non-volatile external storage device for a computer such as a personal computer. This disk device 1 has, as shown in the developed view in FIG. 1, a head disk assembly (described as HDA hereinafter) 10 and a printed circuit board 5 externally attached to a bottom surface of the base 2.

Provided inside an enclosure of the HDA 10 and on the printed circuit board 5 externally attached to the enclosure are data record reproducing circuits respectively. The record reproducing circuit inside the enclosure of the HDA 10 (Hereinafter a circuit for recording or reproducing data inside an enclosure is generically described as an intra-HDA record reproducing circuit) and the record reproducing circuit on the printed circuit board 5 (Hereinafter a circuit for recording or reproducing data outside the enclosure is generically described as extra-HDA record reproducing circuit) are electrically connected to each other via a flexible printed circuit sheet (described as FPC hereinafter) 4 and a connector 50 (a connector engaging the connector 50 on a rear surface of the HDA is not shown in the figure).

Parallel write data sent from an upper device such as a basic system of a computer not shown herein is received by the extra-DHA record reproducing circuit and subjected to prespecified processing, and is sent as it is via the FPC 4 to the intra-HDA record reproducing circuit. The parallel data inputted to the intra-HDA record reproducing circuit is converted to serial data there and is written in a disk 12.

The HDA 10 has an FPC 4, a spindle motor 11, a plurality of disks 12 each rotated by the spindle motor 11, a head 13 for data read/write, and a carriage 14 assembled and accommodated in an enclosure with the base 2, a cover 3, and a packing 6 shielded therein. A head IC 15 is attached onto the carriage 14.

On the other hand, two pieces of ICs 21, 22 (the number not limited to 2) are packaged in a section of the FPC 4 supported by a support plate 20. These ICs 15, 21, 22 and other electronic parts (not shown) provided on the FPC 4 are electrically connected to each other via the FPC 4. The intra-HDA record reproducing circuit comprises the ICs 15, 21, 22 and other electronic parts (now shown) on the FPC 4.

An IC 51 and other electronic parts are packaged on the externally attached printed circuit board 5, and various peripheral circuits such as the extra-HDA record reproducing circuit or a servo control circuit are provided therein. When power is turned ON, the spindle motor is rotated, and when the rpm reaches a specified value, the head rises to above the disk. After the various circuits are initialized, input of a command from an upper device is waited for.

Figure 2:
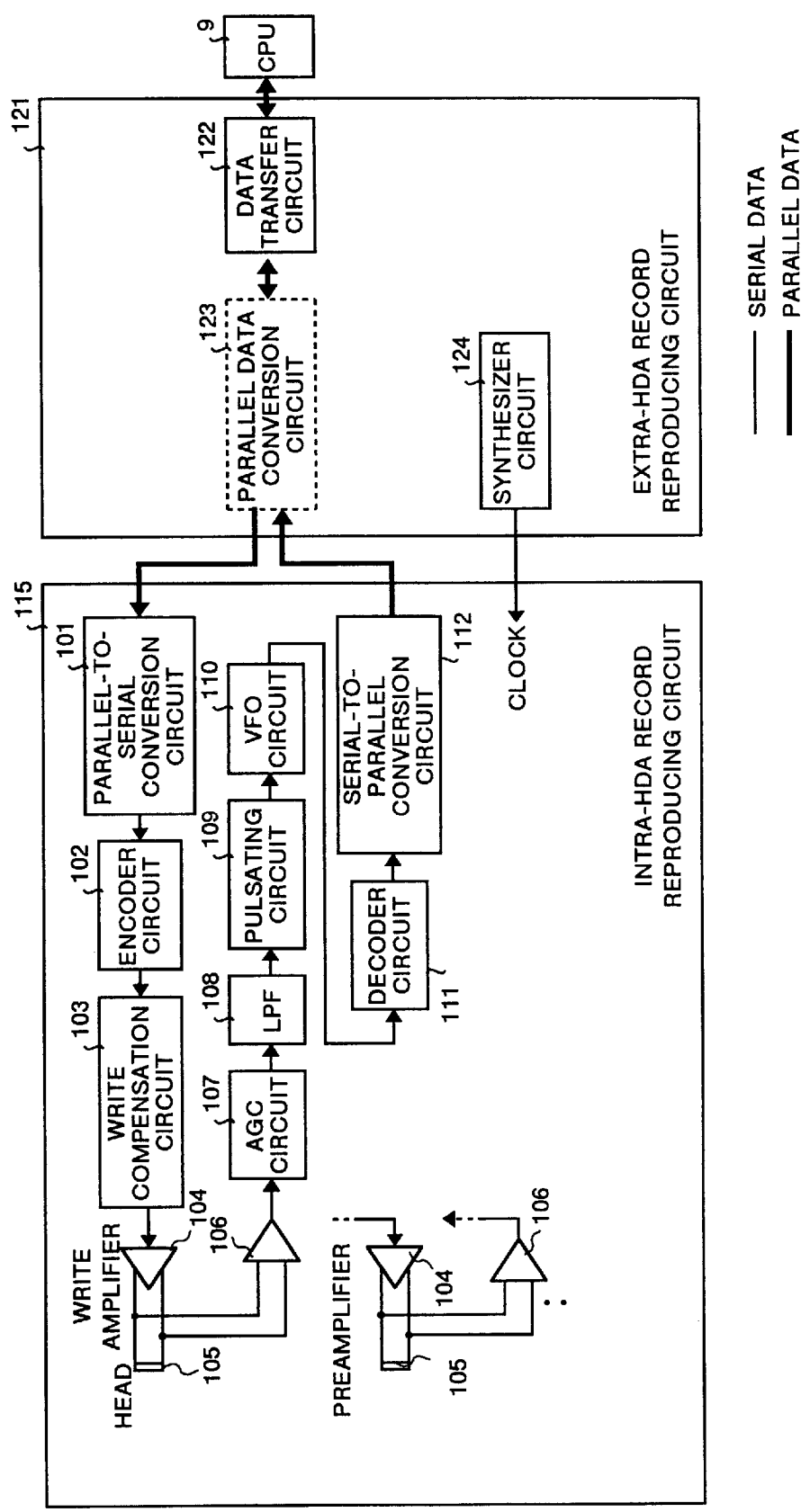
FIG. 2 is a block diagram showing Embodiment 1 of circuit configuration of the storage device according to the present invention.

FIG. 2 is a block diagram showing circuit configuration of a section related to data recording and reproduction in the magnetic disk device 1. In this magnetic device 1, as described above, an intra-HDA record reproducing circuit 115 and an extra-HDA record reproducing circuit 121 are provided on the inter-DHA printed circuit board 10 and the externally attached printed circuit board 5. Herein, the intra-HDA record reproducing circuit 115 has functions as an internal recording circuit and an internal reproducing circuit, while the extra-HDA record reproducing circuit 121 has functions as an external recording circuit and an external reproducing circuit.

It should be noted that, in FIG. 2, only a transfer path relating to data written in or read out is shown and a parallel data transfer path is shown with a relatively thick solid line, while a serial data transfer path is shown with a relatively thin line (also in FIG. 4 through FIG. 9).

In the magnetic disk device 1 according to Embodiment 1, as shown in FIG. 2, also read data read out via the head from the disk is transferred in the parallel mode from the intra-HDA record reproducing circuit 115 to the extra-HDA record reproducing circuit 121. The example shown in FIG. 2 is a case where a peak detection system for, for instance, 1/7 code is employed as a data record reproducing system.

The extra-HDA record reproducing circuit 121 has a data transfer circuit 122, a parallel data conversion circuit 123, and a synthesizer circuit 124. The data transfer circuit 122 transfers parallel write data sent from a central processing unit (described as CPU hereinafter) of an upper device such as a basic system of a computer to the parallel data conversion circuit 123, and also transfers parallel read data sent from the parallel data conversion circuit 123 to the CPU 9.

The parallel data conversion circuit 123 converts write data and read data to parallel data having a prespecified format according to the necessity and outputs the parallel data to the intra-HDA record reproducing circuit 115 as well as to the data transfer circuit 122. The synthesizer circuit 124 generates a clock signal as a timing signal for writing data and outputs the clock signal to each of the extra-HDA record reproducing circuit 121 and intra-HDA record reproducing circuit 115.

The intra-HDA record reproducing circuit 115 has data recording circuits including a parallel-to-serial conversion circuit 101, an encoder circuit 102, a write compensation circuit 103, and a write amplifier 104. The parallel-to-serial conversion circuit 101 converts parallel write data sent from the extra-HDA record reproducing circuit 121 to serial data. The encoder circuit 102 encodes serial write data converted by the parallel-to-serial conversion circuit 101 to code having a prespecified format such as 1/7 code.

The write compensation circuit 103 previously corrects a peak shift of code sent from the encoder circuit 102. The write amplifier 104 switches a polarity of a recording current for the head 105 according to the encoded write data sent from the write compensation circuit 103.

An FF (Flip Flop) not shown herein for recording data with an NRZI (NO Return to Zero Interleave) is provided in either one of the write compensation circuit 103 and write amplifier 104. With this configuration, a frequency of write data is reduced to a half of the original value in the FF and on.

The intra-HDA record reproducing circuit 115 has a data reproducing circuit including a preamplifier 106, an AGC (Automatic Gain Control) circuit 107, a low pass filter (LPF) 108, a pulsating circuit 109, a phase synchronizing circuit (VFO circuit) 110, a decoder circuit 111, and a serial-to-parallel conversion circuit 112. The preamplifier 106 amplifies a reproducing voltage (read signal) detected by the head 105.

The AGC circuit 107 provides automatic control for a gain so that amplitude of a read signal amplifier by the preamplifier 106 is kept constant. The low pass filter 108 removes unnecessary high frequency noises from the read signal adjusted by the AGC circuit 107 so that the signal has constant amplitude. The pulsating circuit 109 generates serial read data by converting the read signal with high frequency noises removed therefrom by the low pass filter 108 to a pulse corresponding to the peak.

The phase synchronizing circuit 110 comprises a PLL (phase lock loop) circuit for synchronizing read data generated by the pulsating circuit 109 to a clock signal. The decoder circuit 111 decodes read data for, for instance, 1/7 code synchronized to a clock signal. The serial-to-parallel conversion circuit 112 converts the read data encoded by the decoder circuit 111 to, for instance, 2-bit or 1-byte parallel data, and outputs the parallel data to the extra-HDA record reproducing circuit 121.

The data transfer circuit 122 and CPU 9 are connected to each other with, for instance. data bus having a prespecified width of a 1-byte or 2-byte. Although not shown herein, the data transfer circuit 122 has a buffer section for temporally storing specified bytes of data and a control section for providing controls for receiving the incoming data.

The parallel data conversion circuit 123 receives write data sent from the data transfer circuit 122 and converts the data to, for instance, 2-bit or 1-byte parallel data according to the necessity. Also the parallel data conversion circuit 123 receives read data sent from the intra-HDA record reproducing circuit 115 and converts the data to, for instance, 1-byte parallel data according to the necessity.

It should be noted that, as the parallel data conversion circuit 123 is omitted in a device in which conversion of the number of bits of parallel data is not required, the circuit is shown with a broken line in FIG. 2 (also in FIG. 4 through FIG. 9). When the parallel data conversion circuit 123 is omitted, transaction of write data and read data is executed directly between the data transfer circuit 122 and the intra-HDA record reproducing circuit 115.

The synthesizer circuit 124 generates a timing signal (write clock)for writing data by multiplying a frequency of an oscillation circuit using a quartz oscillator or the like.

The data transfer circuit 122 is connected to the parallel data conversion circuit 123, and the parallel data conversion circuit 123 to the parallel-to-serial conversion circuit 101 as well as to the serial-to-parallel conversion circuit with a data bus respectively.

The write compensation circuit 103 is a circuit provided to previously compensate a peak shift due to interference between waveforms, and delays a write timing by a specified rate in correspondence to a write bit.

As for circuit operations in the magnetic disk device shown in FIG. 2, description is made for a case where a write command is sent from an upper device. Then the head moves onto a target track of the disk and is positioned there. When write data is sent via data bus having bus width of, for instance, 1-bite or 2-bite from the CPU 9 of a basic system of a computer or the like which is an upper device, the write data is received by the data transfer circuit 122 of the extra-HDA record reproducing circuit 121 provided outside an enclosure for the magnetic disk device. In this data transfer circuit 122, write data is temporally stored in a buffer section therein.

The write data temporally stored in the buffer section of the data transfer circuit 122 is sent at a prespecified timing to the parallel data conversion circuit 123, and is converted to, for instance, 2-bit or 1-byte parallel data. In this step, the timing signal is supplied to, for instance, the synthesizer circuit 124. The write data converted to parallel data having a specified number of bits is sent via an external data bus having a specified bus width to the parallel-to-serial conversion circuit 101 in the intra-HDA record reproducing circuit 115.

When the parallel data conversion circuit 123 is not provided, the write data is directly sent from the data transfer path 122 via an external data bus to the parallel-to-serial conversion circuit 101 in the intra-HDA record reproducing circuit 115. Up to this section the write data is parallel one.

The write data (parallel data) sent to the parallel-to-serial conversion circuit 101 in the intra-HDA record reproducing circuit 115 is converted in the parallel-to-serial conversion circuit 101 to serial data. In this step and on, the write data is processed as serial data.

The write data converted to serial data is sent from the parallel-to-serial conversion circuit 101 to the encoder circuit 102. Then the write data is converted, for instance, to 1/7 code in this encoder circuit 102, and is outputted to the write compensation circuit 103.

In the write compensation circuit 103, correction of a peak shift in the write data encoded in the encoder circuit 102 is previously executed. The corrected write data is sent to the write amplifier 104.

In the write amplifier 104, a polarity of a recording current for the head 105 is switched according to the write data sent from the write compensation circuit 103. A recording current is supplied to a head selected from a plurality of heads at a specified timing, so that the write data is recorded at a target sector of a target track in a disk.

Next description is made for circuit operations when a read command is issued from an upper device and data stored in a disk is read out. In this step, the head moves to a target track of the disk and is positioned there. When a reproducing voltage corresponding to recorded data is detected by the head from the target section at a prespecified timing, the reproducing voltage is amplified as a read signal by the preamplifier 106. The amplified read signal is sent to the AGC circuit 107.

In the AGC circuit 107, a gain of the read signal sent from the preamplifier 106 is automatically controlled so that amplitude of the read signal is kept constant. The read signal having been subjected to the gain control is sent to the low pass filter 108.

The read signal sent to the low pass filter 108 is converted to a signal with unnecessary high frequency components removed therefrom because of the filtering effect when passing through the low pass filter 108. The read signal with high frequency component having been removed therefrom is set to the pulsating circuit 109.

In the pulsating circuit 109, the read signals sent from the low pass filter 108 is converted to a pulse corresponding to the peak, which generates read data (serial data). The generated serial read data is sent to the phase synchronizing circuit (VFO circuit) 110. The read data sent to the phase synchronizing circuit (VFO circuit) 110 is changed to read data. synchronized to a clock signal and is sent to the decoder circuit:

In the decoder circuit 111, the read data in, for instance, 1/7 code sent from the phase synchronizing circuit (VFO circuit) 110 is decoded. Then the decoded read data is sent to the serial-to-parallel conversion circuit 112. The read data up to this step is serial data.

In the serial-to-parallel conversion circuit 112, the decoded serial read data is converted, for instance, to 2-bit or 1-byte parallel data. Then the read data is processed as parallel data. The parallel read data is outputted via an external data bus to the extra-HDA record reproducing circuit 121.

The 2-bit or 1-byte parallel read data sent to the extra-HDA record reproducing circuit 121 is converted in the parallel data conversion circuit 123 to, for instance, 1-byte parallel data. This converted parallel data is sent via an internal data bus having, for instance, a 1-byte bus width, to the data transfer circuit 122.

When the parallel data conversion circuit 123 is not provided, for instance, 2-bit or 1-byte parallel read data is directly sent from the serial-to-parallel conversion circuit 112 in the intra-HDA record reproducing circuit 115 via an external data bus to the data transfer circuit 122. The parallel read data sent to the data transfer circuit 122 is once stored in a buffer section in the data transfer circuit 122, and then is set to the CPU 9 of a computer or the like which is an upper device by data unit of 1 byte or 2 bytes.

In Embodiment 1 of the present invention, the encoder circuit 102, write compensation circuit 103, and write amplifier 104 are provided in an enclosure for the HDA 10, so that a serial transfer path between a circuit just before the write amplifier including the encoder circuit 102 and write compensation circuit 103 and the write amplifier 104 is formed with a section for wiring for the FPC 4 within an enclosure for the HDA 10, so that the serial transfer path between a circuit just before the write amplifier and the write amplifier 104 in this embodiment is remarkably shorted as compared to that between a record reproducing circuit in a read channel IC packaged on a printed circuit board outside an enclosure for an HDA and a write amplifier in an enclosure for an HDA based on the conventional technology, so that write data can be transferred at a high speed without the pulse amplitude being lowered.

In Embodiment 1, a plurality of bits are transmitted in parallel in a long section of a transfer path between the extra-HDA record reproducing circuit 121 and the intra-HDA record reproducing circuit 115 to transfer write data in the parallel mode, so that write data can be transferred at a high speed without the pulse amplitude being lowered.

Further in Embodiment 1, the preamplifier 106, AGC circuit 107, low pass filter 108, pulsating circuit 109, phase synchronizing circuit 110, and decoder circuit 111 are provided in an enclosure for the HDA, and a plurality of bits are transmitted in parallel to and from a reproducing circuit outside the enclosure for the HDA to transfer read data in the parallel mode, so that also read data can be transferred at a high speed.

With Embodiment 1, as any circuit for serial data having already been developed can be used as the write compensation circuit 103, there is no need to work on new development or the like for the write compensation circuit 103, the stability of operating the write compensation circuit 103 is insured, and the reliability of the write compensation circuit 103, the intra-HDA record reproducing circuit 115 including the circuit 103, and further of the entire disk device 1 is enhanced. Further, the write compensation circuit 103 for serial data has circuit configuration simpler as compared to that of the write compensation circuit (record-timing correcting circuit) for parallel data disclosed, for example, in Japanese Patent Laid-Open Publication No. HEI 9-55023, so that an IC chip or the like having the write compensation circuit 103 with no extra costs required as well as with less heating value can be minimized.

It should be noted that, in Embodiment 1, the encoder circuit 102 is provided in the intra-HDA record reproducing circuit 115, and serial write data is encoded in the encoder circuit 102, but the configuration is not limited to that described above, and in place of providing the encoder circuit 102, an encoder circuit may be provided outside the intra-HDA record reproducing circuit 115, for instance, inside the extra-HDA record reproducing circuit 121. In this case, the parallel write data may be converted to serial data by the parallel-to-serial conversion circuit 101 in the intra-HDA record reproducing circuit 115 after it is encoded.

Figure 3:
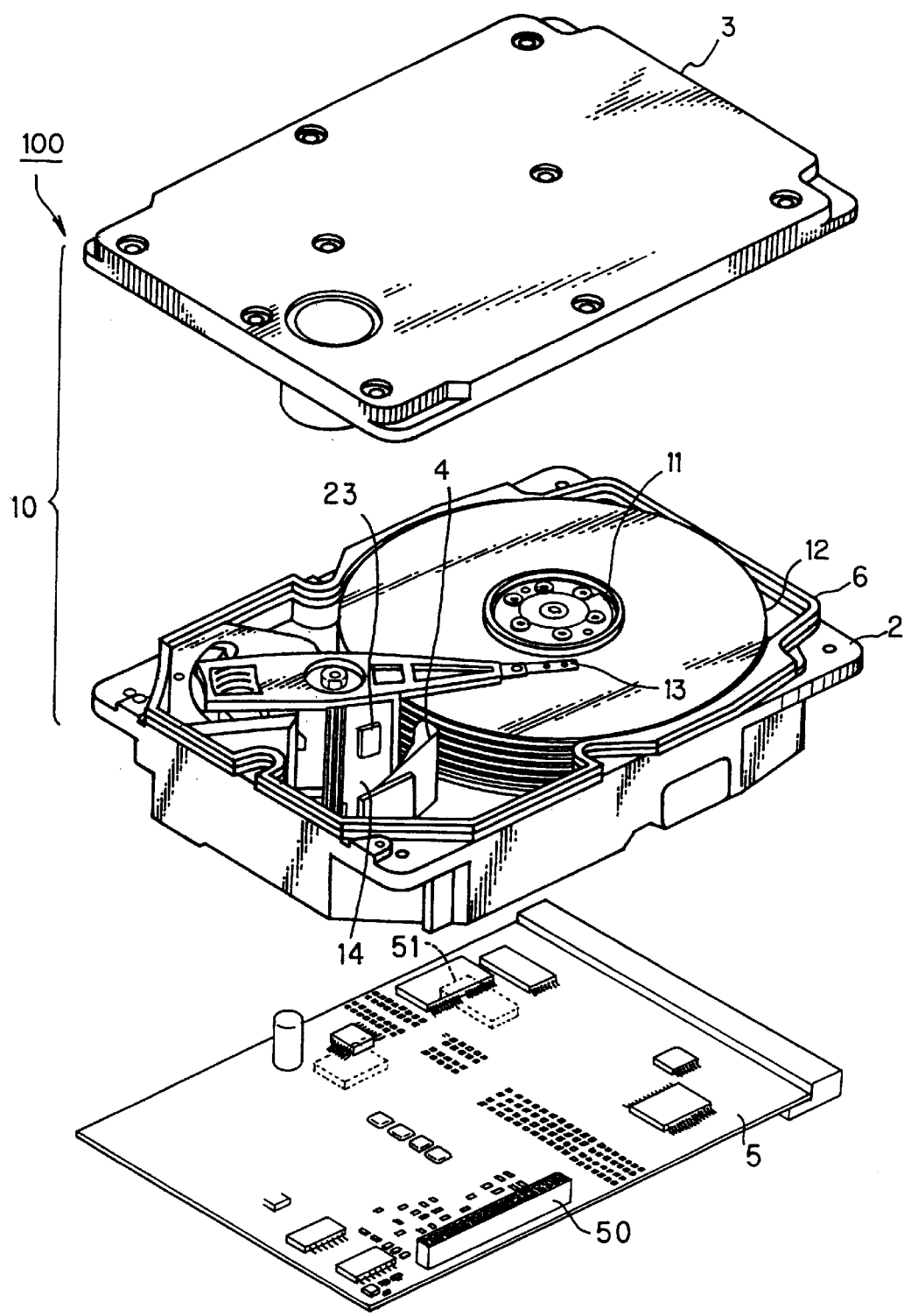
FIG. 3 is an external perspective view showing another example of mechanical configuration of the storage device according to the present invention.

Further in Embodiment 1, as shown in FIG. 1, the IC 15 and ICs 21, 22 each constituting the intra-HDA record reproducing circuit 115 is packaged on the carriage 14 as well as on the FPC 4, but the configuration is not limited to this one, and like in the magnetic disk device 100 shown in FIG. 3, the intra-HDA record reproducing circuit may be integrated into the IC 23, which may be packaged, for instance, on the carriage 14. It should be noted that, in FIG. 3, a portion of the FPC 4 is shown in the broken state to clearly show the IC 23.

Figure 4:
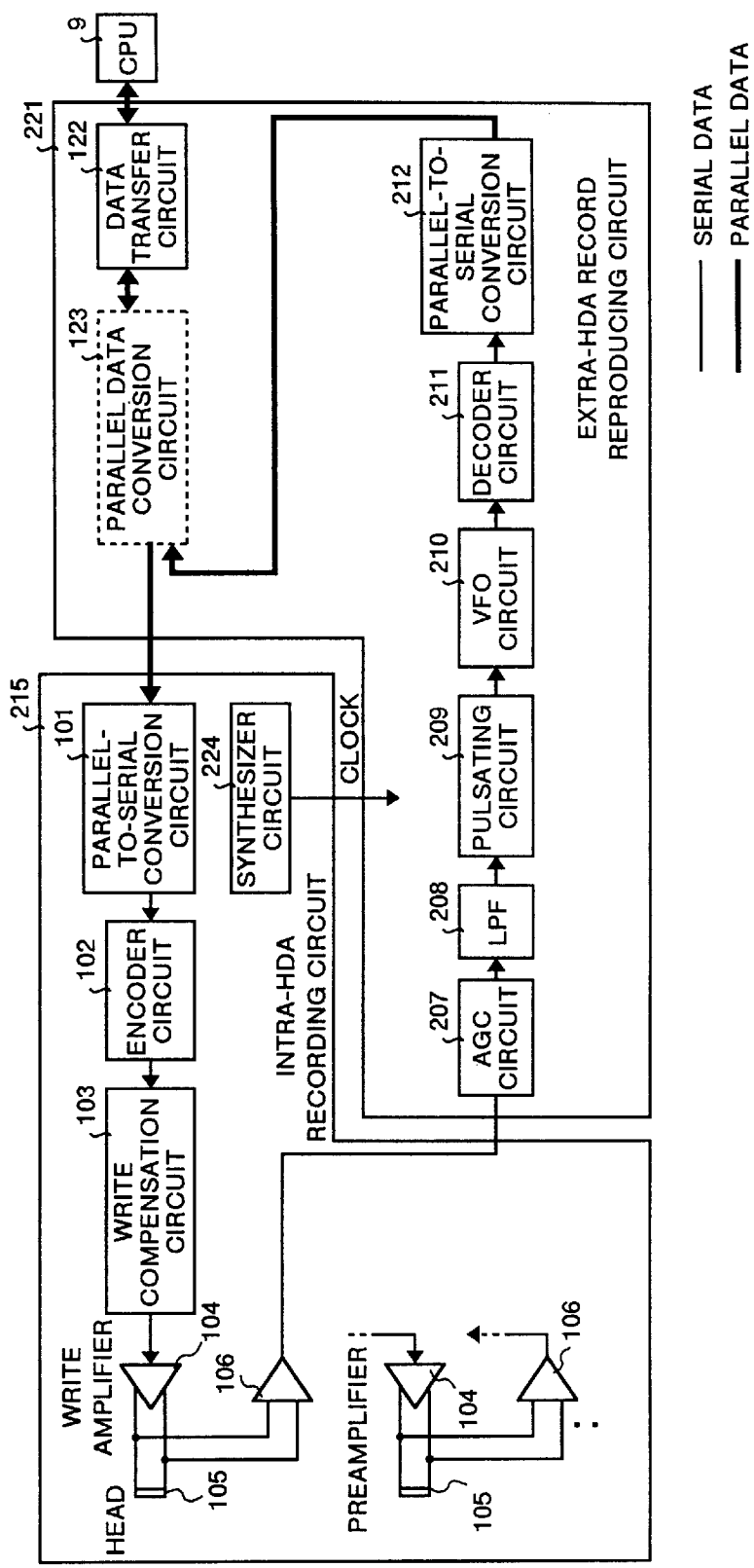
FIG. 4 is a block diagram showing Embodiment 2 of circuit configuration of the storage device according to the present invention.

FIG. 4 is a block diagram showing circuit configuration of a section relating to recording and reproduction of data in a magnetic disk device according to Embodiment 2 of the present invention. Circuit configuration of the magnetic disk device shown in FIG. 4 is different from that of the magnetic device according to Embodiment 1 shown in FIG. 2 in the following 4 points.

Namely, the first point that a data reproducing circuit in included in an extra-HDA record reproducing circuit. The second point is that read data is transferred as a serial read signal from an intra-HDA recording circuit 215 to an extra-HDA record reproducing circuit 221. The third point is that a circuit equivalent to a serial-to-parallel conversion circuit is included in the extra-HDA record reproducing circuit 221. The fourth point is that a synthesizer circuit 224 is included in the intra-HDA recording circuit 215. Herein, the intra-HDA recording circuit 215 has a function as an internal recording circuit, while the extra-HDA record reproducing circuit 221 has functions as an external recording circuit and an external reproducing circuit. It should be noted that the same reference numerals are assigned to the same components as those in Embodiment 1 and description thereof is omitted herein.

In the case shown in FIG. 4, a peak detection system for 1/7 code or the like is employed as a data recording/reproducing system. The extra-HDA record reproducing circuit 221 has a data transfer circuit 122, a parallel data conversion circuit 123, an AGC circuit 207, a low pass filter (LPF) 208, a pulsating circuit 209, a phase synchronizing circuit (VFO circuit) 210, a decoder circuit 211, and a serial-to-parallel conversion circuit 212.

The AGC circuit 207, low pass filter 208, pulsating circuit 209, phase synchronizing circuit 210, decoder circuit 211, and serial-to-parallel conversion circuit 212 form a data reproducing circuit. The AGC circuit 207 provides automatic controls for a gain so that amplitude of a serial read signal sent from the preamplifier 106 in the intra-HDA recording circuit 215 is kept constant. The low pass filter (LPF) 208 removes unnecessary high frequency noises from the read signal adjusted by the ACG circuit 207 so that the signal has constant amplitude.

The pulsating circuit 209 generates serial read data by converting the read signal with high frequency noises having been removed therefrom by the low pass filter 208 to a pulse corresponding to the peak. The phase synchronizing circuit (VFO circuit) 210 comprises a PLL circuit for synchronizing the read data generated by the pulsating circuit 209.

The decoder circuit 211 decodes read data in, for instance, 1/7 code synchronized to a clock signal. The serial-to-parallel conversion circuit 212 converts the read data decoded by the decoder circuit 211 to, for instance, 2-bit or 1-byte parallel data and outputs the parallel data to the parallel data conversion circuit 123.

The intra-HDA recording circuit 215 has a data recording circuit including the parallel-to-serial conversion circuit 101, encoder circuit 102, write compensation circuit 103, and write amplifier 104. The intra-HDA recording circuit 215 has the preamplifier 106 and synthesizer circuit 224. The synthesizer circuit 224 generates a timing signal (write clock) for writing data by multiplying a frequency of an oscillation circuit using a quartz oscillator or the like. The generated timing signal is outputted to each section of the intra-HDA recording circuit 215 as well as in the extra-HDA record reproducing circuit 221.

The data transfer circuit 122 is connected to the parallel data conversion circuit 123 and the parallel data conversion circuit 123 to the parallel-to-serial conversion circuit 101 as well as to the serial-to-parallel conversion circuit 212 with a data bus respectively.

Next description is made for operations of a magnetic disk device having the circuit configuration shown in FIG. 4. An operation for writing data in a disk is the same as that in the circuit configuration according to Embodiment 1 shown in FIG. 2, so that description thereof is omitted herein. Next description is made for circuit operations when a read command is issued from an upper device and data recorded in a disk is read out therefrom.

The head is moved to a target track on the disk and is positioned there. When a reproducing voltage corresponding to recorded data is detected at a prespecified timing from the target sector, the reproducing voltage is amplified as a read signal by the preamplifier 106. The amplified read signal is sent in the serial state to the AGC circuit 207 in the intra-HDA record reproducing circuit 221. A gain of the read signal sent to the AGC circuit 207 is automatically controlled to kept the amplitude at a constant value, and is sent to the low path filter 208.

The read signal sent to the low pass filter 208 is changed to a signal with unnecessary high frequency removed therefrom by the filtering function when passing through the low pass filter 208, and is sent to the pulsating circuit 209. The read signals sent to the pulsating circuit 209 is converted to the pulse corresponding to the peak to become serial read data, and is sent to the phase synchronizing circuit (VFO circuit) 210.

The read data sent to the phase synchronizing circuit (VFO circuit) 210 is changed to read data synchronized to a clock signal and is sent to the decoder circuit 211. In the decoder circuit 211, read data in, for instance, 1/7 code sent from the phase synchronizing circuit (VFO circuit) 120 is decoded. Then the decoded read data is converted in the serial-to-parallel conversion circuit 212 to, for instance, 2-bit or 1-byte parallel data.

The parallel read data is sent via the parallel data conversion circuit 123 and data transfer circuit 122 to the CPU 9 of a computer or the like which is an upper device by data unit of 1 byte or 2 bytes.

In Embodiment 2 of the present invention, the encoder circuit 102, write compensation circuit 103, and write amplifier 104 are provided in an enclosure for the HDA 10, so that a serial transfer path between a circuit just before the write amplifier including the encoder circuit 102 and write compensation circuit 103 and the write amplifier 104 is formed with a portion of wiring for the FPC 4 inside the enclosure for HDA 10, so that the serial transfer path between a circuit before the write amplifier and write amplifier 104 in this embodiment is remarkably shorted as compared to that between a record reproducing circuit in a read channel IC packaged on a printed circuit board outside a case for an HDA and a write amplifier in an enclosure for an HDA based on the conventional technology, so that write data can be transferred at a high speed without the pulse amplitude being lowered.

Further in Embodiment 2, a plurality of bits are transferred in parallel through a long section of a transfer path for write data between the extra-HDA record reproducing circuit 221 and the intra-HDA recording circuit 215 to transfer write data in the parallel mode, so that the write data can be transferred at a high speed without the pulse amplitude being lowered.

Further in Embodiment 2, the synthesizer circuit 224 is provided in an enclosure for an HDA so that a transfer path for a clock signal required for writing data in the intra-HDA recording circuit 215 is formed with short wiring, and for this reason a high frequency clock signal can be used without the pulse amplitude thereof being lowered and an operation for writing data can be executed at a higher speed.

With Embodiment 2, as any circuit for serial data having already been developed can be used as the write compensation circuit 103, like in Embodiment 1, there is no need to work on new development or the like for the write compensation circuit 103 by using the write compensation circuit for serial data, the stability of operating the write compensation circuit 103 is insured, which makes the reliability higher, and the circuit configuration is simpler as compared to that of the write compensation circuit for parallel data, so that an IC chip or the like having the write compensation circuit 103 with no extra costs required as well as with less heating value can be minimized.

Further in Embodiment 2, a read signal is transferred serially from the intra-HDA recording circuit 215 to the extra-HDA record reproducing circuit 221, but as an output from the preamplifier 106 in the intra-HDA recording circuit 215 is an analog signal with magnetism reversion of the disk corresponding to the peak, the analog signal can be transferred even with a frequency band width narrower as compared to that of write data which is a pulse signal, so that no trouble is generated in a high speed operation for reading data.

It should be noted that the intra-HDA recording circuit 215 may be provided in a single IC chip.

Also in Embodiment 2 above, in place of providing the encoder circuit 10 in an enclosure for an HDA, an encoder circuit is provided within an enclosure for the HDA, and the write data may be converted to serial data by the parallel-to-serial conversion circuit 101 in the intra-HDA recording circuit 215 after the parallel write data is encoded in the encoder circuit.

Figure 5:
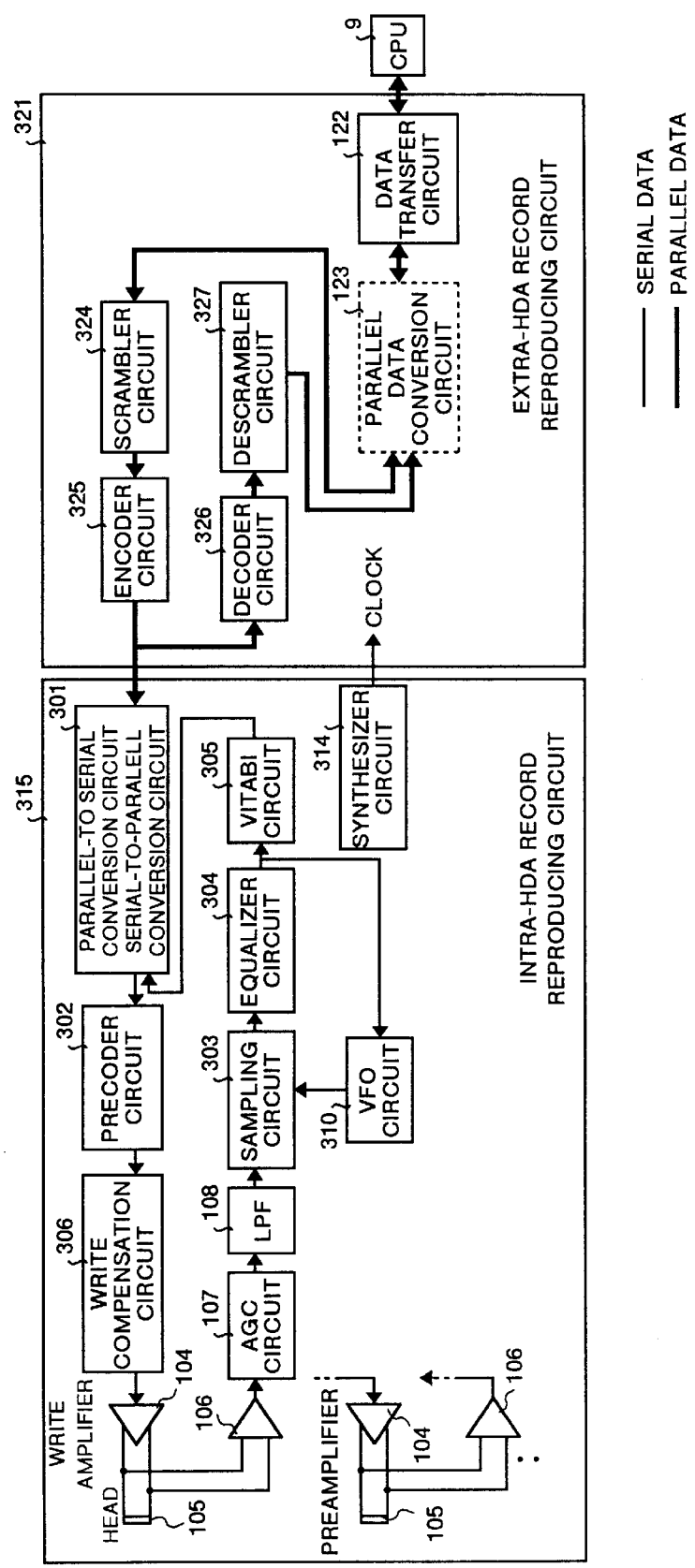
FIG. 5 is a block diagram showing Embodiment 3 of circuit configuration of the storage device according to the present invention.

FIG. 5 is a block diagram showing circuit configuration of a section relating to recording and reproduction of data in a magnetic disk device according to Embodiment 3 of the present invention. In the magnetic disk device shown in FIG. 5, a record reproducing system based on the PRML (Partial Response Most Likelihood) system in place of a record reproducing system based on the peak detection system employed in Embodiment 1 as well as in Embodiment 2. The same reference numerals are assigned to the same components as those in Embodiment 1 described above, and description thereof is omitted herein.

An extra-HDA record reproducing circuit 321 comprises a data transfer path 122, a parallel data conversion circuit 123, a scrambler circuit 324, an encoder circuit 325, a decoder circuit 325, and a descrambler circuit 327. Herein, the extra-HDA record reproducing circuit 321 has functions as an external recording circuit and an external reproducing circuit. The scrambler circuit 324 randomizes parallel write data sent from the parallel data conversion circuit 123.

The encoder circuit 325 converts the randomized write data to, for instance, 9-bit parallel data (for instance, 8–9 conversion). The decoder circuit 326 converts parallel read data sent from time intra-HDA record reproducing circuit 315 to, for instance 8-bit parallel data (for instance, 9–8 conversion). The descrambler circuit 327 returns the random data to the original parallel data and outputs the data to the parallel data conversion circuit 123.

The intra-HDA record reproducing circuit 315 has a data recording circuit comprising a parallel-to-serial/serial-to-parallel conversion circuit 301, a precoder circuit 302, a write compensation circuit 306, and a write amplifier 104. Herein, the intra-HDA record reproducing circuit 315 has functions as an internal recording circuit and an internal reproducing circuit. The parallel-to-serial/serial-to-parallel conversion circuit 301 has a function to convert parallel write data sent from the extra-HDA record reproducing circuit 321 to serial data and a function to convert serial read data to parallel data.

The precoder circuit 302 previously executes a reverse operation for equalization of (1+D) (D: Delay operator) to the write data converted to serial data, namely an operation for 1/(1+D). The write compensation circuit 306 previously corrects a peak shift.

Provided in either one of the write compensation circuit 306 and write amplifier 104 is an FF (Flip Flop) not shown herein for recording data with the NRZI (No Return to Zero Interleave) format. With this feature, a frequency of write data is ½ of the original value in the FF and on.

The intra-HDA record reproducing circuit 315 has a data reproducing circuit including a preamplifier 106, an AGC circuit 107, a low pass filter (LPF) 108, a sampling circuit 303, a phase synchronizing circuit (VFO) 310, an equalizer circuit 304, and a vitabi detector circuit 305.

The sampling circuit 303 samples a voltage at an effective point as data from a read signal with high frequency noises removed therefrom. The phase synchronizing circuit (VFO circuit) 310 supplies a clock signal for sampling to the sampling circuit 303 and also supplies a clock signal to the decoder circuit 326 in the extra-HDA record reproducing circuit 321 as well as to the descrambler circuit 327.

The equalizer circuit 304 equalizes for (1+D) together with low pass filter 108, and outputs any of three types of voltage; +1, 0, and −1 (Note that any of noises has a certain voltage width). The vitabi detection circuit 305 identifies to which of +1, 0, and −1 the output voltage including noises in the equalizer circuit 304 corresponds.

Further the intra-HDA record reproducing circuit 315 has a synthesizer circuit 314 for generating a timing signal (write clock) for writing data by multiplying a frequency of an oscillation circuit using a quarts oscillator or the like, and outputting the timing signal to each section of the intra-HDA record reproducing circuit 315 and extra-HDA record reproducing circuit 321.

The data transfer circuit 122 is connected to the parallel data conversion circuit 123, parallel data conversion circuit 123 to the scrambler circuit 324 as well as to the descrambler circuit 327, scrambler circuit 324 to the encoder circuit 325, decoder circuit 326 to the descrambler circuit 327, and encoder circuit 325 to the decoder circuit 326 as well as to the parallel-to-serial/serial-to-parallel conversion circuit 301 each with data bus respectively. A bus between the encoder circuit 325 and the decoder circuit 326 as well as the parallel-to-serial/serial-to-parallel conversion circuit 301 is a bidirectional bus.

Next description is made for circuit operations in the magnetic disk device shown in FIG. 5 when a write command is sent from an upper device. Then the head is moved to a target track of a disk and is positioned there. Write data sent via an external data bus from the CPU 9 is temporally stored in a buffer section of the data transfer circuit 122 of the extra-HDA record reproducing circuit 321, and then is sent to the parallel data conversion circuit 123 at a specified timing synchronized to a clock signal supplied from, for instance, the synthesizer circuit 314, and is converted therein to, for instance, 2-bit or 1-byte parallel data.

The write data converted by the parallel data conversion circuit 123 is sent to and randomized in the scrambler circuit 324 and then is sent to the encoder circuit 325, where the data is subjected to, for instance, 8–9 conversion to become 9-bit parallel data. When the parallel data conversion circuit 123 is not provided, the write data is directly sent from the data transfer circuit 122 to the scrambler circuit 324, and then to the encoder circuit 325.

The parallel data having been subjected to, for instance, 8–9 conversion in the encoder circuit 325 is sent to the parallel-to-serial/serial-to-parallel conversion circuit 301 in the intra-HDA record reproducing circuit 315 via an external data bus and is converted to serial data therein.

The write data converted to serial data is sent to the precoder circuit 302, where an operation expressed by 1/(1+D) is executed using a delay operator D to the write data, and a peak shift in the write data is corrected by the write compensation circuit 306. In the write amplifier 104, a polarity of a recording current for the head 105 is switched and the write data is recorded on the disk.

It should be noted that, in this step, a specified disk and a head are selected from a plurality of disks and a plurality of heads respectively according to select signals for a disk and a head, and also the disk is rotated by a motor with the head moved to a specified position.

Next description is made for circuit operations when a read command is issued from an upper device and data recorded in a disk is read out. Then the head is moved to a target track on the disk and is positioned there. When a reproducing voltage corresponding to recorded data is detected by the head at a specified timing from a target sector, the reproducing voltage is amplified as a serial read signal by the preamplifier 106. The read signal amplified by the preamplifier 106 is sent to the AGC circuit 107 and the gain is automatically controlled to keep the amplitude constant, and then is sent to the low pass filter 108.

The read signal sent to the low pass filter 208 is sent to the sampling circuit 303 with unnecessary high frequency component removed therefrom and is sampled there according to a clock signal supplied from the phase synchronizing circuit (VFO circuit) 310. With this feature, a voltage at an effective point is extracted as data from the read signal.

Equalization for (1+D) is executed by the equalizer circuit 304 to a voltage at the point sampled by the sampling circuit. With this operation, any of the voltages of +1, 0, and −1 is outputted from this equalizer circuit 304. However, any of the three values has a certain width due to noises. A voltage signal having a width due to noises is sent to the vitabi detection circuit 305, where determination is made to which of +1, 0, and −1 the sent voltage signal corresponds to.

Read data comprising the voltage signal identified by the vitabi detection circuit 305 is converted by the parallel-to-serial/serial-to-parallel conversion circuit 301 to parallel data, and the parallel data is sent via an external bus to the decoder circuit 326 in the extra-HDA record reproducing circuit 321.

The parallel data sent from the intra-HDA record reproducing circuit 315 is subjected to, for instance, 9–8 conversion in the decoder circuit 326, and is returned in the descrambler circuit 327 from randomized data to the original data.

The read data returned to the original data is converted in the parallel data conversion circuit 123 to, for instance, 1-byte parallel data and is transferred via an internal bus to the data transfer circuit 122. When the parallel data conversion circuit 123 is not provided, the read data is directly sent from the descrambler circuit 327 to the data transfer circuit 122. The parallel read data sent to the data transfer circuit 122 is temporally stored in a buffer section of the data transfer circuit 122, and then is sent to the CPU 9 of a computer or the like which is an upper device by data unit of 1 byte or 2 bytes.

In Embodiment 3, the intra-HDA record reproducing circuit 315 including the precoder circuit 302, write compensation circuit 306, and write amplifier 104 is provided in the HDA 10, so that a serial transfer path between a circuit just before the write amplifier including the precoder circuit 302 and the write compensation circuit 306 and the write amplifier 104 is formed with a portion of wiring for the FPC 4 in the HDA 10, so that the serial transfer path between a circuit just before the write amplifier and the write amplifier 104 in this embodiment is remarkably shorter as compared to that between a record reproducing circuit in a read channel IC packaged on a printed circuit board outside the HDA and a write amplifier in the HDA based on the conventional technology, and for this reason write data can be transferred at a high speed without the pulse amplitude being lowered.

Further in Embodiment 3, a plurality of bits are transferred in parallel through a long section of a write data transfer path between the extra-HDA record reproducing circuit 321 and intra-HDA record reproducing circuit 315 and write data is transferred in the parallel mode, so that write data can be transferred at a high speed without the pulse amplitude being lowered.

Further in Embodiment 3, the synthesizer circuit 314 is provided in the intra-HDA record reproducing circuit 315, so that a transfer path for a clock signal required for writing data in the intra-HDA record reproducing circuit 315 is formed with short wiring, so that a high frequency clock signal is used without the pulse amplitude being lowered, and a writing operation can be executed at a higher speed.

Further in Embodiment 3, the intra-HDA record reproducing circuit 315 has a data reproducing circuit including the preamplifier 106, AGC circuit 107, low pass filter 108, sampling circuit 303, phase synchronizing circuit 310, equalizer circuit 304, and vitabi detection circuit 305, and also a plurality of bits are transferred in parallel between the data reproducing circuit and the extra-HDA record reproducing circuit 321 to transfer read data in the parallel mode, so that also read data can be transferred at a high speed.

With Embodiment 3, as any circuit for serial data having already been developed can be used as the write compensation circuit 306, like in Embodiment 1, there is no need to work on new development or the like for the write compensation circuit 306 by using the write compensation circuit for serial data, the stability of operating the write compensation circuit 306 is insured, which makes the reliability higher, and the circuit configuration is simpler as compared to that of the write compensation circuit for parallel data, so that an IC chip or the like having the write compensation circuit 306 with no extra costs required as well as with less heating value can be minimized.

It should be noted the intra-HDA record reproducing circuit 315 may be provided in a single IC chip.

Also a bus between the encoder circuit 325 and the decoder circuit 326 as well as the parallel-to-serial/serial-to-parallel conversion circuit 301 is not limited to a bidirectional bus, and may be a one-way bus respectively.

In place of providing the scrambler circuit 324, encoder circuit 325, descrambler circuit 327, and decoder circuit 326 in the extra-HDA record reproducing circuit 321,. the circuits may be provided in the intra-HDA record reproducing circuit 315.

Figure 6:
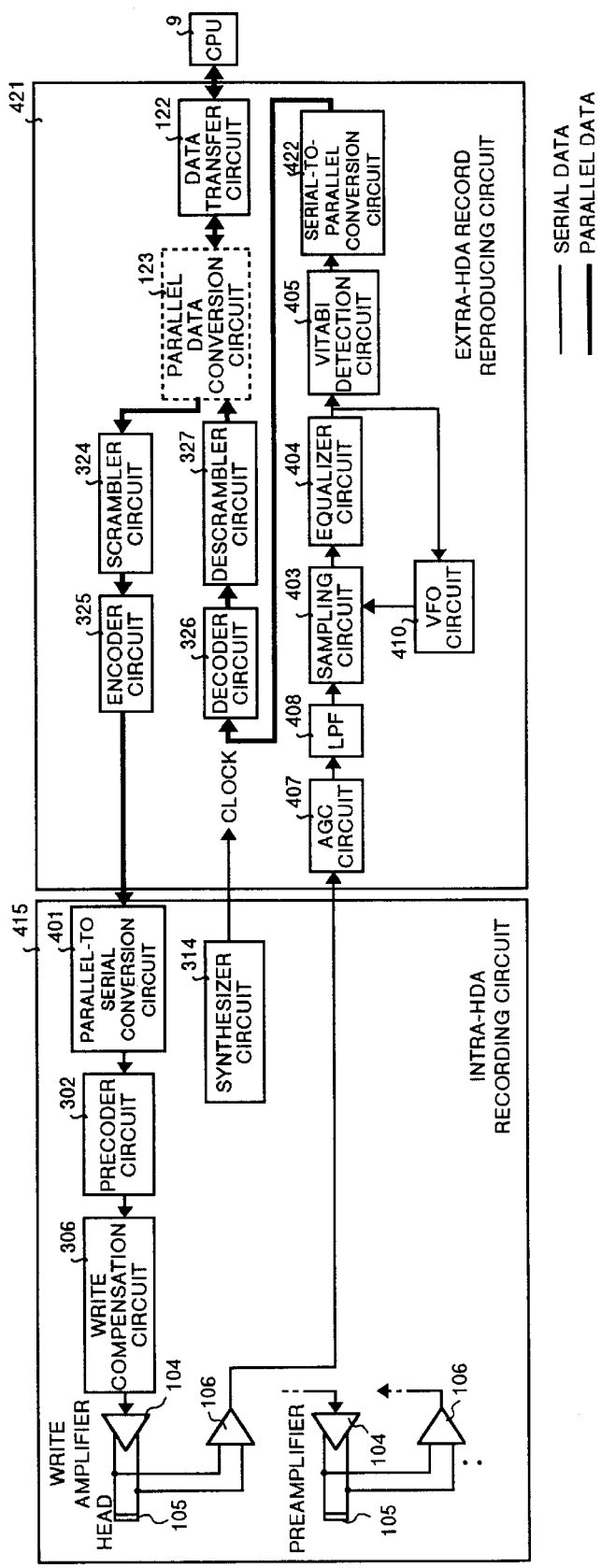
FIG. 6 is a block diagram showing Embodiment 4 of circuit configuration of the storage device according to the present invention.

FIG. 6 is a block diagram showing circuit configuration of a section relating to recording and reproduction of data in the magnetic disk device in FIG. 6. In the magnetic disk device shown in FIG. 6, a record reproducing system based on the PRML (partial Response Most Likelihood) system is employed like in Embodiment 3 shown in FIG. 5, but circuit configuration of the magnetic disk shown in FIG. 6 is different from that of the magnetic disk device according to Embodiment 3 shown in FIG. 5 in the following 5 points.

Namely, the first point is that a data reproducing circuit is included in an extra-HDA record reproducing circuit 421. The second point is that read data is transferred as a serial read signal from an intra-HDA recording circuit 415 to the extra-HDA record reproducing circuit 421. The third point is that a parallel-to-serial conversion circuit 422 is included in the extra-HDA record reproducing circuit 421. Herein, the intra-HDA recording circuit 415 has a function as an internal recording circuit, while the extra-HDA record reproducing circuit 421 has functions as an external recording circuit and external reproducing circuit.

The fourth point is that the parallel-to-serial conversion circuit 401 is provided in an intra-HDA recording circuit 415. The fifth point is that an external data bus between the encoder circuit 325 and the parallel-to-serial conversion circuit 401 is based on a one-way bus form. It should be noted that the same reference numerals are assigned to the same components as those in Embodiment 1 as well as in Embodiment 3 and description thereof is omitted herein.

The extra-HDA record reproducing circuit 421 comprises a data transfer circuit 122, a parallel data conversion circuit 123, a scrambler circuit 324, an encoder circuit 325, an AGC circuit 407, a low pass filter (LPF) 408, a sampling circuit 403, a phase synchronizing circuit (VFO circuit) 410, an equalizer circuit 404, a vitabi detection circuit 405, a Serial-to-parallel conversion circuit 422, a decoder circuit 326, and a scrambler circuit 327.

The AGC circuit 407, low pass filter 408, sampling circuit 403, phase synchronizing circuit 410, equalizer circuit 404, and vitabi detection circuit 405 form a data reproducing circuit. The AGC circuit 407 provides automatic controls for a gain so that an amplitude of a read signal outputted from the preamplifier of the intra-HDA recording circuit 415 is kept constant.

The low pass filter (LPF) 408 removes unnecessary high frequency noises from a gain-controlled read signal. The sampling circuit 403 samples a voltage at an effective point as data from the read signal with high frequency noises removed therefrom. The phase synchronizing circuit (VFO circuit) 410 supplies a clock signal for sampling to the sampling circuit 403, and also supplies a clock signal to the decoder circuit 326 as well as to the descrambler circuit 327 in the extra-HDA record reproducing circuit 421.

The equalizer circuit 404 executes equalization for (1+D) together with the low pass filter 408, and outputs any of the three types of voltage, +1, 0, and −1 (It should be noted that any of the voltages has a certain voltage width due to noises). The vitabi detection circuit 405 determines which of +1, 0, and −1 an output voltage including noises from the equalizer circuit 404 corresponds. The serial-to-parallel conversion circuit 422 converts serial read data comprising the voltage signal determined by the vitabi detection circuit 405 to parallel data.

The intra-HDA recording circuit 415 has a data recording circuit comprising a parallel-to-serial conversion circuit 401, a precoder circuit 302, a write compensation circuit 306, and a write amplifier 104. Also the intra-HDA recording circuit 415 has a preamplifier 106 and a synthesizer circuit 314. The parallel-to-serial conversion circuit 401 converts parallel write data sent from the extra-HDA record reproducing circuit 421 to serial data.

The encoder circuit 325 is connected to the parallel-to-serial conversion circuit 401, and the serial-to-parallel conversion circuit 422 to the decoder circuit 326 each with a data bus respectively.

Next description is made for circuit operations of the magnetic disk shown in FIG. 6 assuming a case when a write command comes from an upper device. Then the head moves to a target track on a disk and is positioned there. The write data sent via an external bus from the CPU 9 is temporally stored in a buffer section of the data transfer circuit 122 in the extra-HDA record reproducing circuit 421, and then is converted by the parallel data conversion circuit 123 to, for instance, 2-bit or 1-byte parallel data.

The parallel data converted to 2-bit or 1-byte data is sent via the scrambler circuit 324, encoder circuit 325, and an external bus to the parallel-to-serial conversion circuit 401 in the intra-HDA recording circuit 415, where the parallel data is converted to serial data. When the parallel data conversion circuit 123 is not provided, the write data is directly sent from the data transfer circuit 122 to the scrambler circuit 324.

The write data converted to serial data is recorded via the precoder circuit 302, write compensation circuit 306, and write amplifier 104 in a disk.

Next description is made for circuit operations when a read command is issued from an upper device and data recorded in a disk is read out. Then the head moves onto the target track of the disk and is positioned there. A reproducing voltage corresponding to recorded data is detected by the head at a prespecified timing from the target sector, and then the reproducing voltage is amplified as a serial read signal by the preamplifier 106.

The read signal amplified by the preamplifier 106 is sent to the AGC circuit 407 in the extra-HDA record reproducing circuit 421 with the amplitude kept constant under gain control, and then is sent to the low pass filter 408.

The read signal sent to the low pass filter 408 is sent to the sampling circuit 403 with unnecessary high frequency components removed therefrom, where the read signal is sampled according to a clock signal supplied by the phase synchronizing signal (VFO circuit) 410. With this operation, a voltage at an effective point is extracted as data from the read signal.

Equalization for (1+D) is executed by the equalizer circuit 404 to a voltage at a point sampled by the sampling circuit. With this operation, any voltage of +1, 0, and −1 is outputted from this equalizer circuit 404. However, any of the three values has a certain width due to noises. The voltage signal having a width due to noises is sent to the vitabi detection circuit 405, and determination is made to which of +1, 0, and −1 the voltage signal sent thereto corresponds.

The read data comprising the voltage signal determined by the vitabi detection circuit 405 is converted by the serial-to-parallel conversion circuit 422 to parallel data, and the parallel data is sent via the decoder circuit 326, descrambler circuit 327, parallel data conversion circuit 123, and data transfer circuit to the CPU 9. When the parallel data conversion circuit 123 is not provided, read data is directly sent from the descrambler circuit 327 to the data transfer circuit 122.

In Embodiment 4, the intra-HDA recording circuit 415 including the precoder circuit 302, write compensation circuit 306, and write amplifier 104 are provided in an enclosure for the HDA 10, so that a serial transfer path between a circuit just before the write amplifier including the precoder circuit 302 and write compensation circuit 306 and the write amplifier 104 is formed with a portion for wiring for the FPC 4 in the HDA 10, and for this reason the serial transfer path between the circuit just before the write amplifier and the write amplifier 104 according to this Embodiment is remarkably shorted as compared to a serial transfer path between a record reproducing circuit in a read channel IC packaged on a printed circuit board outside an enclosure for an HDA and write amplifier in an enclosure for an HDA based on the conventional technology, so that write data can be transferred at a high speed without the pulse amplitude being lowered. It should be noted that a small printed board may be provided in an HDA, not on the FPC itself, to connect the FPC thereto.

Further in Embodiment 4, a plurality of bits are transferred in parallel through a long section of a write data transfer path between the extra-HDA record reproducing circuit 421 and the intra-HDA recording circuit 415 to transfer write data in the parallel mode, so that write data can be transferred at a high speed without the pulse amplitude being lowered.

Further in Embodiment 4, the synthesizer circuit 314 is provided in the intra-HDA recording circuit 415, so that a transfer path for a clock signal required for writing data in the intra-HDA recording circuit 415 is formed with short wiring, and for this reason a high frequency clock signal can be used with a pulse amplitude of a clock signal being lowered, and an operation for writing data can be executed at a high speed.

Further in Embodiment 4, read data is serially transferred from the intra-HDA recording circuit 415 to the extra-HDA record reproducing circuit 421, but an output from the preamplifier 106 in the intra-HDA recording circuit 415 is an analog signal with magnetism reversion of a disk corresponding to the peak, so that the read signal can be transferred with a frequency band width narrower as compared to that for write data which is a pulse signal, and for this reason no trouble occurs in a high speed operation for reading data.

With Embodiment 4, as any circuit for serial data having already been developed can be used as the write compensation circuit 306, like in Embodiment 1, there is no need to work on new development or the like for the write compensation circuit 306 by using the write compensation circuit for serial data, the stability of operating the write compensation circuit 306 is insured, which makes the reliability higher, and the circuit configuration is simpler as compared to that of the write compensation circuit for parallel data, so that an IC chip or the like having the write compensation circuit 306 with no extra costs required as well as with less heating value can be minimized.

It should be noted the intra-HDA recording circuit 415 may be provided in a single IC chip.

Also the scrambler circuit 324 and encoder circuit 325 may be provided in the intra-HDA recording circuit 415 in place of providing the circuits in the extra-HDA record reproducing circuit 421.

Figure 7:
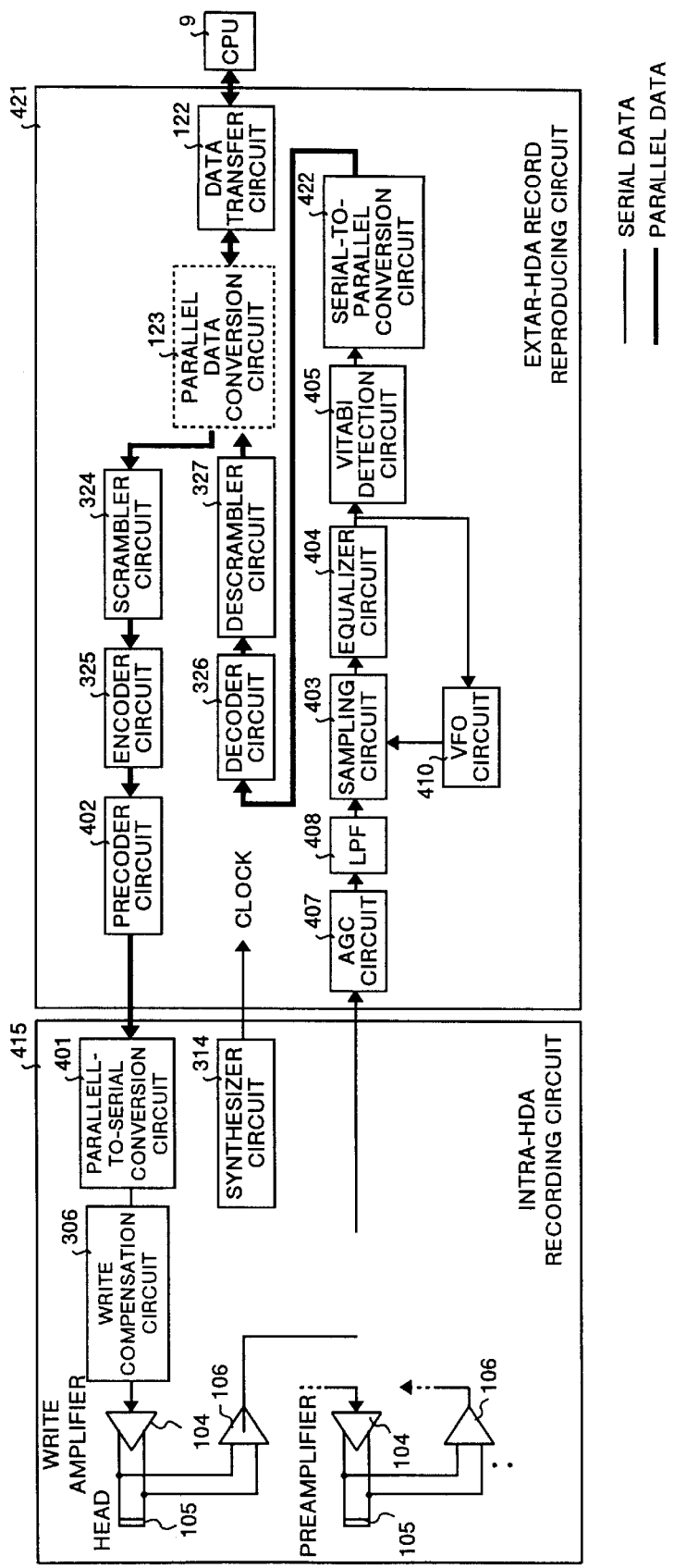
FIG. 7 is a block diagram showing a variant of circuit configuration in Embodiment 4.

Also like in the variant shown in FIG. 7, the configuration is allowable in which the precoder circuit 302 is removed from the intra-HDA recording circuit 415 and also the precoder 402 capable of responding to parallel data may be provided just behind the encoder circuit 325 in the extra-HDA record reproducing circuit 421.

Figure 8:
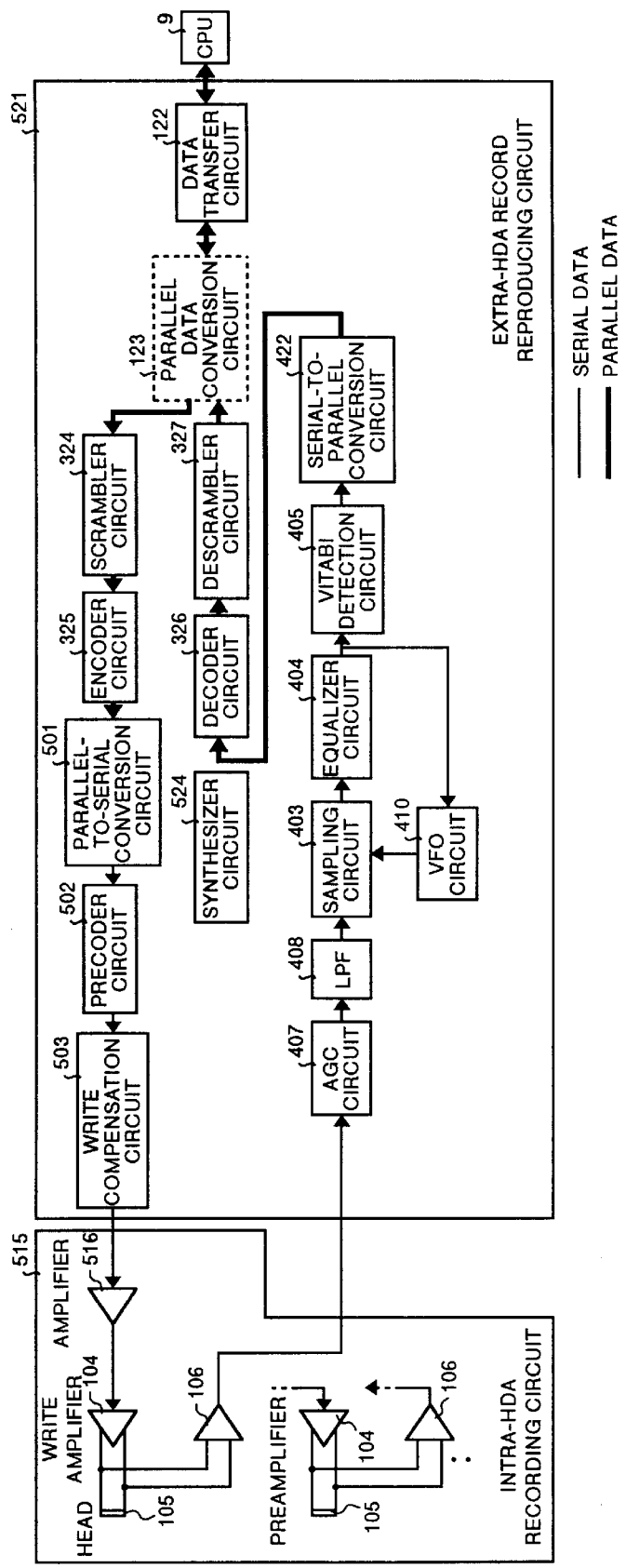
FIG. 8 is a block diagram showing Embodiment 5 of circuit configuration of the storage device according to the present invention.

FIG. 8 is a block diagram showing circuit configuration of a section relating to recording and reproduction of data in a magnetic disk device according to Embodiment 5 of the present invention. The magnetic disk device shown in FIG. 8 is a record reproducing system based on the PRML (Partial Response Most Likelihood) system, in which a an amplifier 516 is provided before a write amplifier 104 in an intra-HDA recording circuit 515, serial write data (pulse) sent from an extra-HDA record reproducing circuit 521 is amplified by the amplifier 516 and sent out with the degraded rise and fall corrected therein. Herein, the intra-HDA recording circuit 515 has a function as an internal recording circuit, while the extra-HDA record reproducing circuit 521 has functions as an external recording circuit and an external reproducing circuit. It should be noted that the same reference numerals are assigned to the same components as those in any of the embodiments described above and detailed description thereof is omitted herein.

The extra-HDA record reproducing circuit 521 has a data transfer circuit 122, a parallel data conversion circuit 123, a scrambler circuit 324, an encoder circuit 325, a parallel-to-serial conversion circuit 501, a precoder circuit 502, and a write compensation circuit 503.

The parallel-to-serial conversion circuit 501 converts parallel write data converted by the encoder circuit 325 to serial data. The precoder circuit 502 previously executes an operation for 1/(1+D) to write data converted to serial data. The write compensation circuit 503 previously corrects a peak shift.

The extra-HDA record reproducing circuit 521 comprises an AGC circuit 407, a low pass filter (LPF) 408, a sampling circuit 403, a phase synthesizing circuit (VFO) circuit 410, an equalizer circuit 404, a vitabi detection circuit 405, a serial -to- parallel conversion circuit 422, a decoder circuit 326, and a descrambler circuit 327.

Further the extra-HDA record reproducing circuit 521 has a synthesizer circuit 524 generating a timing signal (write clock) for writing data by multiplying a frequency of an oscillation circuit using a quartz oscillator or the like and outputting the timing signal to each section of the extra-HDA record reproducing circuit 521.

Intra-HDA recording circuit 515 comprises an amplifier 516, a write amplifier 104, and a preamplifier 106. The amplifier 516 amplifies serial write data sent from the extra-HDA record reproducing circuit 521 and regenerates the lowered level.

An FF (Flip Flop) not shown herein for recording data with the NRZI (No Return to Zero Interleave) format is provided in either the write compensation circuit 503 or the write amplifier 104. With this configuration, a frequency of write data in the FF and on is reduced to a half (½) of the original value.

The write compensation circuit 503 is a circuit provided to previously compensate a non-linear recording distortion generated in a disk (medium) when a recording frequency is high, and slightly changes a write timing. When recording distortion is not generated, the write compensation circuit 503 may be omitted.

The data transfer circuit 122 is connected to the parallel data conversion circuit 123, the parallel data conversion circuit 123 to the scrambler circuit 324 as well as to the descrambler circuit 327, the scrambler circuit 324 to the encoder circuit 325, the encoder circuit 325 to the parallel-to-serial conversion circuit 501, serial-to-parallel conversion circuit 422 to the decoder circuit 326, and the decoder circuit 326 to the descrambler circuit 327 each with a data bus respectively.

Next description is made for circuit operations in the magnetic disk device shown in FIG. 8 assuming a case where a write command comes from an upper device. Then the head moves to a target track on a disk and is positioned thereon. Write data sent via an external data bus from the CPU 9 is sent via the data transfer circuit 122, parallel data conversion circuit 123, scrambler circuit 324, and encoder circuit 325 each in the extra-HDA record reproducing circuit 521 to the parallel-to-serial conversion circuit 501, wherein the write data is converted to serial data. When the parallel data conversion circuit 123 is not provided therein, the write data is directly sent from the data transfer circuit 122 to the scrambler circuit 324.

The write data converted to serial data is sent to the precoder circuit 502, where an operation expressed by 1/(1+D) is executed using a delay operator D to the write data, and then peak shift in the write data is corrected by the write compensation circuit 503.

A level having lowered due to serial transmission over a long transmission distance of serial write data with peak shift corrected is reproduced by the amplifier 516 in the intra-HDA recording circuit 515. The write data with the level reproduced is recorded via the write amplifier 104 in a disk.

Next description is made for circuit operations when a read command is issued from an upper device and data recorded in a disk is read out therefrom. Then the head moves to a target track on the disk and is positioned there. When a reproducing voltage corresponding to recorded data is detected by the head at a specified timing from the target sector, the reproducing voltage is amplified as a serial read data.

The read signal amplified by the preamplifier 106 is sent to the AGC circuit 407 in the extra-HDA record reproducing circuit 521, and then is sent via the low pass filter 408, sampling circuit 403, equalizer circuit 404, vitabi detection circuit 405, serial-to-parallel conversion circuit 422, decoder circuit 326, descrambler circuit 327, parallel data conversion circuit 123, and data transfer circuit 122 to the CPU 9. When the parallel data conversion circuit 123 is not provided, the read data is directly sent from the descrambler circuit 327 to the data transfer circuit 122.

In Embodiment 5, the amplifier 516 is provided in the intra-DHA recording circuit in the HDA 10, so that a level of write data with the level lowered due to serial transmission over a long distance between the extra-HDA record reproducing circuit 521 and the intra-HDA recording circuit 515, and for this reason write data can be transferred at a high speed.

Further in Embodiment 5, read data is serially transferred from the intra-HDA recording circuit 515 to the extra-HDA record reproducing circuit 521, but output from the preamplifier 106 in the intra-HDA recording circuit 515 is an analog signal with magnetic reversion of a disk corresponding to the peak, so that the signal can be transferred even with a frequency band width narrower as compared to that of write data which is a pulse signal, and for this reason no trouble occurs in a high speed operation for reading data.

Figure 9:
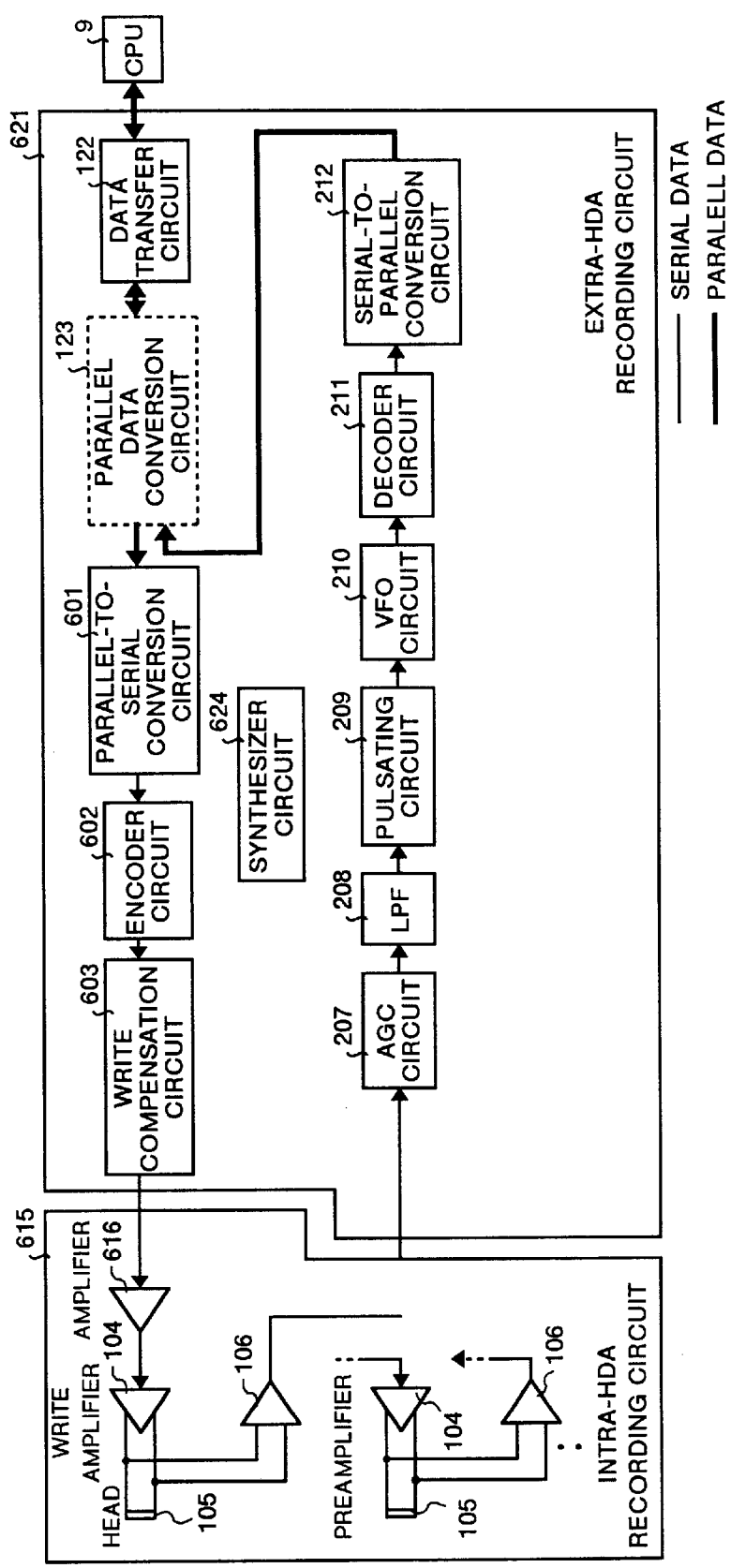
FIG. 9 is a block diagram showing Embodiment 6 of circuit configuration of the storage device according to the present invention.
Figure 10:
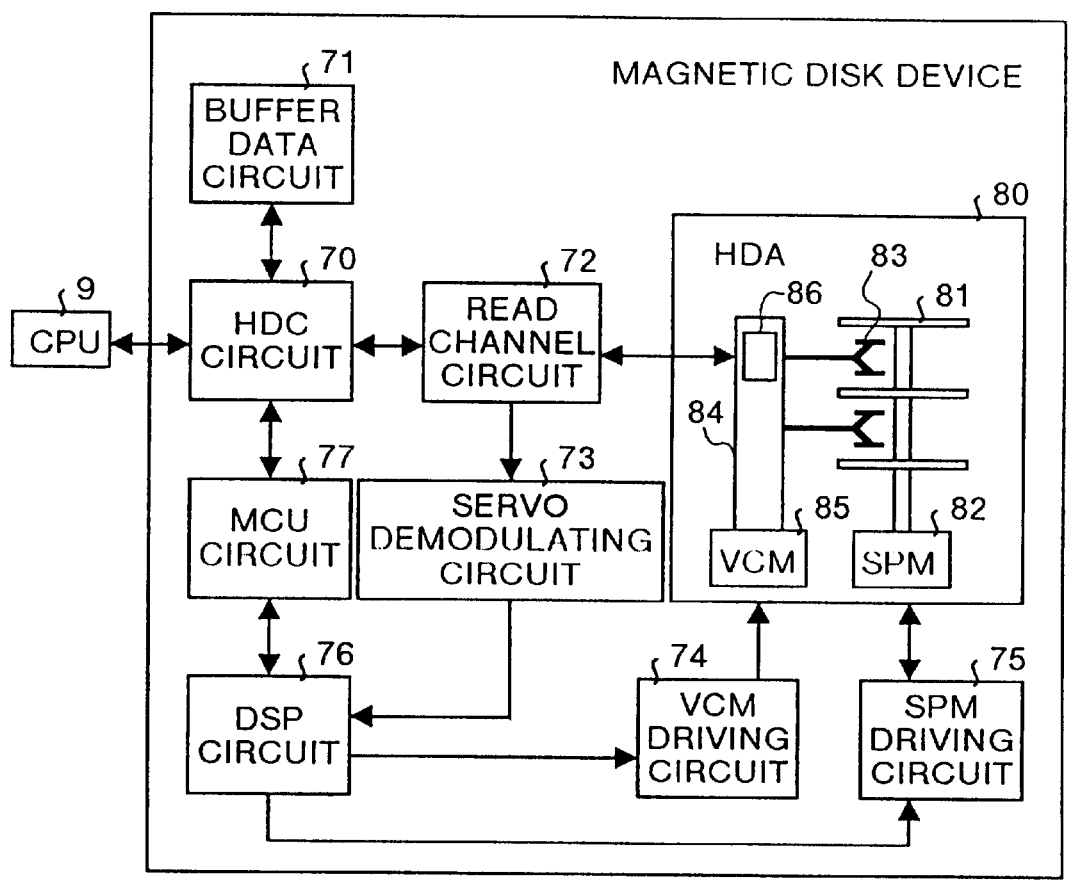
FIG. 10 is a block diagram showing configuration of a storage device based on the conventional technology.

FIG. 9 is a block diagram showing circuit configuration of a section relating to recording and reproduction of data in a magnetic disk device according to Embodiment 6 of the present invention. The magnetic disk device shown in FIG. 9 is based on a record reproducing system based on the peak detection system, in which an amplifier 616 is provided just before the write amplifier 104 in the intra-HDA recording circuit 615, and serial write data (pulse) sent from an extra-HDA record reproducing circuit 621 is amplified by the amplifier 616 and sent out with the degraded rise and fall times corrected. Herein, the intra-HDA recording circuit 615 has a function as an internal recording circuit, while the extra-HDA record reproducing circuit 621 has functions as an external recording circuit and an external reproducing circuit. It should be noted that the same reference numerals are assigned to the same components as those in any of the embodiments above and detailed description thereof is omitted herein.

The extra-HDA record reproducing circuit 621 comprises a data transfer circuit 122, parallel data conversion circuit 123, parallel-to-serial conversion circuit 601, encoder circuit 602, and write compensation circuit 603. The parallel-to-serial conversion circuit 601 converts write data converted by the parallel data conversion circuit 123 to serial data.

The encoder circuit 602 encodes the serial write data converted as described above to code having a specified format such as 1/7 code. The write compensation circuit 603 previously corrects peak shift in the code sent from the encoder circuit 602.

The extra-HDA record reproducing circuit 621 has an AGC circuit 207, a low pass filter (LPF) 208, a pulsating circuit 209, a phase synchronizing circuit (VFO) 210, a decoder circuit 211, and parallel-to-serial conversion circuit 212.

Further the extra-HDA record reproducing circuit 621 has a synthesizer circuit 624 for generating a clock signal as a timing signal for writing data and outputting the clock signal to each section of the extra-HDA record reproducing circuit 621.

The intra-HDA recording circuit 615 has an amplifier 616, a write amplifier 104 and a preamplifier 106. The amplifier 616 amplifies serial write data (pulse) sent from the extra-HDA record reproducing circuit 621 and sends the data with the degraded rise and fall times corrected.

An FF (Flip Flop) not shown herein for recording data with the NRZI (No Return to Zero Interleave) format is provided in either the write compensation circuit 603 or the write amplifier 104. With this configuration, a frequency of write data is reduced to ½ in the FF and on.

The write compensation circuit 603 is a circuit provided to previously provide peak shift due to interference between waveforms, and slightly changes the timing for writing data. When interference between waveforms is compensated by a read circuit, the write compensation circuit 603 may be omitted.

The data transfer circuit 122 is connected to the parallel data conversion circuit 123, and the parallel data conversion circuit 123 to the parallel-to-serial conversion circuit 601 as well as to the serial-to-parallel conversion circuit 212 each with a data bus respectively.

Next description is made for actions of the magnetic disk device having the circuit configuration shown in FIG. 9. At first, description is made for an operation for writing data in a disk. Write data sent from via an external data bus from the CPU 9 is sent via the data transfer circuit 122 and parallel data conversion circuit 123 each in the extra-HDA record reproducing circuit 621 to the parallel-to-serial conversion circuit 601 and is converted to serial data there. When the parallel data conversion circuit 123 is not provided, the write data is directly sent from the data transfer circuit 122 to the parallel-to-serial conversion circuit 601.

The write data having been converted to serial data is converted to, for instance, 1/7 code in the encoder circuit 602, and peak shift in the write data is corrected in the write compensation circuit 603.

The serial write data with the peak shift corrected is sent to the intra-HDA recording circuit 615 with the rise and fall degraded on the way of transfer path corrected by the amplifier 616 and is recorded via the write amplifier 104 in a disk.

Next description is made for an operation for reading data recorded in a disk. A disk and a head are selected and rotated by a motor with the head moved to a specified position. When a reproducing voltage corresponding to recorded data is detected, the reproducing voltage is amplified as a read signal by the preamplifier 106.

The amplified read signal is sent in the serial state to the AGC circuit 207 in the extra-HDA record reproducing circuit 621. Then the read signal is sent via the AGC circuit 207, low pass filter 208, pulsating circuit 209, phase synchronizing circuit (VFO) 210, decoder circuit 211, serial-to-parallel conversion circuit 212, parallel data conversion circuit 123, and data transfer circuit 122 to the CPU 9.

When the parallel data conversion circuit 123 is not provided, for instance 2-bit or 1-byte parallel read data is directly sent from the serial-to-parallel conversion circuit 212 to the data transfer circuit 212.

In Embodiment 6, the amplifier 616 is provided in the intra-HDA recording circuit 615 in the HDA 10, when white data is serially transferred over a long transmission distance between the extra-HDA record reproducing circuit 621 and the intra-HDA recording circuit 615, the write data degraded in an early stage is reproduced, so that write data can be transferred at a high speed. In the example in FIG. 8 and FIG. 9, if each of the amplifiers 516 and 616 is provided between the intra-HDA recording circuit and the extra-HDA record reproducing circuit, a pulse is not degraded much and correction thereto is made easier, which is more efficient.

Further in Embodiment 6, read data is serially transferred from the intra-HDA recording circuit 615 to the extra-HDA record reproducing circuit 621, but an output from the preamplifier 106 in the intra-HDA recording circuit 615 is an analog signal with magnetism reversion of a disk corresponding to the peak, so that the signal can be transferred with a frequency band narrower as compared to that required for transmission of write data which is a pulse signal, so that no trouble is generated in an high speed operation for reading out data.

A case in which the present invention is applied to a magnetic disk device is described above, but it is needless to say that the present invention can also be applied to other type of disk device such as an optical disk device. The description of the equalizer circuit assumed a case where the equalizer circuit was provided just behind a sampling circuit, but it may be provided before the sampling circuit, and also the configuration is allowable in which both an LPF and an equalizer circuit are provided. Also the PRML detection system includes various types such as PRML and EPRML, and it is needless to say that the same effect can be achieved by applying the present invention to these systems.

Description of Embodiments 1 to 6 above assumed a case of an inductive type of head which can be used for both recording and reproduction, but the configuration is not limited to that described above and it is allowable to employ a hybrid head in which a head for recording and that for reproduction are provided separately and also in which the MR type (Magnet Resistive) type of head is used in the reproduction side.

With the present invention, a serial transfer path between a write amplifier and a circuit just before is remarkably shorted as compared to that between a write amplifier and a circuit just before in a magnetic disk device based on the conventional technology, and also data is transferred in parallel in a long section of a transfer path between an external recording circuit outside a disk assembly and an internal recording circuit in the disk assembly, so that it is possible to obtain a storage device which can transfer write data at a higher speed without the pulse amplitude of write data being lowered. Also, an amplifier is provided between the recording circuit inside the disk assembly and the circuit for recording outside the disk assembly, so that a pulse is not degraded much, correction thereto is made easier, which allows a more efficient storage device to be obtained. As described above, in data transfer in circuits inside and outside an enclosure for a magnetic disk, it is possible to transfer data at a high speed with data reliability maintained.

Also, there is no need to work on new development or the like for a write compensation circuit by using the write compensation circuit for serial data having already been developed, which allows the storage device according to the present invention to speedily execute. By applying any existing write compensation circuit having a track record in performance, the stability of operating the write compensation circuit is insured, and the reliability of the write compensation circuit, the internal recording circuit including the write compensation circuit, and further of the entire disk device is enhanced. Further, the write compensation circuit for serial data has circuit configuration simpler as compared to that of the write compensation circuit (record-timing correcting circuit) for parallel data disclosed, for example, in Japanese Patent Laid-Open Publication No. HEI 9-55023, so that an IC chip or the like having the write compensation circuit with no extra costs required as well as with less heating value can be minimized. Namely, the minimization of an IC chip which can achieve the effect described above, suppress a change in environments of the device because of less heating value, and improve the reliability of record reproduction allows the outer dimensions of the device to be minimized.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A storage device with at least, a head for writing data in or reading data from a storage medium, accommodated in an enclosure thereof, said storage device comprising:

an external recording circuit provided outside said enclosure for outputting write data comprising parallel data; and an internal recording circuit provided inside said enclosure for receiving write data comprising parallel data supplied from said external recording circuit; wherein said internal recording circuit comprising at least:

a parallel-to-serial conversion circuit for converting the received write data comprising parallel data to serial data;

a write compensation circuit for changing a timing for writing data having been converted to serial data; and a write amplifier for switching a polarity of a recording current to be supplied to said head according to the serial write data of which a write timing is adjusted.

2. A storage device according to claim 1; wherein said internal recording circuit is based on the PRML detection system, and said write compensation circuit is a circuit for previously compensating non-linear recording distortion occurring to a recording medium by changing a timing for writing.

3. A storage device according to claim 1; wherein said internal recording circuit is based on the PRML detection system, further has an internal reproducing circuit provided inside the enclosure and also has an external reproducing circuit provided outside the enclosure, and said internal reproducing circuit comprises:

an equalizer circuit for executing an equalizing operation for a read signal amplified by said preamplifier; and a serial-to-parallel conversion circuit for converting read data comprising the serial data having been subjected to an equalizing operation to parallel data and outputting the parallel data to said external reproducing circuit.

4. A storage device according to claim 1; wherein said internal recording circuit further comprises an encoder circuit for encoding the serial data converted by said parallel-to-serial conversion circuit.

5. A storage device according to claim 1; wherein said write compensation circuit is a circuit for previously compensating a peak shift due to interference between waveforms by changing a timing for writing.

6. A storage device according to claim 1; wherein said storage device further comprising at least:

an internal reproducing circuit provided inside the closure and also having an external reproducing circuit provided outside the enclosure; wherein said internal reproducing circuit comprises:

a preamplifier for amplifying a read signal detected by said head;

a decoder circuit for decoding the read signal amplifier by said preamplifier; and a serial-to-parallel conversion circuit for converting the read data comprising the decoded serial data to parallel data and outputting the parallel data to said external reproducing circuit.

7. A storage device according to claim 1; wherein said internal recording circuit is based on the PRML detection system and comprises:

a precoder circuit for previously executing an operation reverse to an equalizing operation executed to read data when reproducing the read data to the serial data converted by said parallel-to-serial conversion circuit.

8. A storage device according to claim 7; wherein said internal recording circuit is based on the PRML detection system, further has an internal reproducing circuit provided inside the enclosure and also has an external reproducing circuit provided outside the enclosure, and said internal reproducing circuit comprises:

an equalizer circuit for executing an equalizing operation for a read signal amplified by said preamplifier; and a serial-to-parallel conversion circuit for converting read data comprising the serial data having been subjected to an equalizing operation to parallel data and outputting the parallel data to said external reproducing circuit.

9. A storage device according to claim 7; wherein said internal recording circuit is based on the PRML detection system, and said write compensation circuit is a circuit for previously compensating non-linear recording distortion occurring to a recording medium by changing a timing for writing.

10. A storage device according to claim 9; wherein said internal recording circuit is based on the PRML detection system, further has an internal reproducing circuit provided inside the enclosure and also has an external reproducing circuit provided outside the enclosure, and said internal reproducing circuit comprises:

an equalizer circuit for executing an equalizing operation for a read signal amplified by said preamplifier; and a serial-to-parallel conversion circuit for converting read data comprising the serial data having been subjected to an equalizing operation to parallel data and outputting the parallel data to said external reproducing circuit.

11. A storage device according to claim 1; wherein said internal recording circuit further comprises:

a synthesizer circuit for generating a timing signal as a clock signal for writing data.

12. A storage device according to claim 1; wherein some or all of the circuits constituting said internal recording circuit and/or the internal reproducing circuit are provided on a carriage supporting said head thereon.

13. A storage device according to claim 12; wherein said internal recording circuit and/or internal reproducing circuit is formed with a single semiconductor chip.

14. A storage device according to claim 1; wherein some or all of the circuits constituting said internal recording circuit and/or internal reproducing circuit are connected to a section between a carriage supporting the head and the external recording circuit and/or said external reproducing circuit and are also provided on a flexible printed circuit board provided inside said enclosure.

15. A storage device according to claim 14; wherein said internal recording circuit and/or internal reproducing circuit is formed with a single semiconductor chip.

* * * * *